(12) United States Patent
Byon et al.

(10) Patent No.: US 12,301,964 B2
(45) Date of Patent: May 13, 2025

(54) CAMERA MODULE AND ELECTRONIC DEVICE COMPRISING SAME

(71) Applicant: SAMSUNG ELECTRONICS CO., LTD., Suwon-si (KR)

(72) Inventors: Kwangseok Byon, Suwon-si (KR); Byungkwon Kang, Suwon-si (KR); Manho Kim, Suwon-si (KR); Hwajoong Jung, Suwon-si (KR); Kihuk Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 178 days.

(21) Appl. No.: 17/946,278

(22) Filed: Sep. 16, 2022

(65) Prior Publication Data

US 2023/0018968 A1    Jan. 19, 2023

Related U.S. Application Data

(63) Continuation of application No. PCT/KR2021/003245, filed on Mar. 16, 2021.

(30) Foreign Application Priority Data

Mar. 16, 2020 (KR) .................. 10-2020-0032243

(51) Int. Cl.
*H04N 23/51* (2023.01)
*G03B 17/02* (2021.01)
(Continued)

(52) U.S. Cl.
CPC ............ *H04N 23/51* (2023.01); *G03B 17/02* (2013.01); *H04N 23/54* (2023.01); *H04N 23/57* (2023.01)

(58) Field of Classification Search
CPC ........ H04N 23/50; H04N 23/51; H04N 23/54; H04N 23/55; H04N 23/57; H04N 23/687
(Continued)

(56) References Cited

U.S. PATENT DOCUMENTS 8,866,919 B2   10/2014  Ahn et al.
9,419,684 B2   8/2016   Kuroda et al.
(Continued)

FOREIGN PATENT DOCUMENTS

CN       111083333 A  *  4/2020  .......... H04M 1/0264
JP       2007-133342       5/2007
(Continued)

OTHER PUBLICATIONS

Korean Office Action dated Aug. 12, 2024 for KR Application No. 10-2020-0032243.

*Primary Examiner* — Anthony J Daniels
(74) *Attorney, Agent, or Firm* — Nixon & Vanderhye P.C.

(57) ABSTRACT

A camera module may include a camera housing, a camera assembly, at least a portion of which is accommodated in the camera housing, the camera assembly including a lens, an image sensor, and a first printed circuit board (PCB), and the camera assembly being coupled to the camera housing so as to be rotatable about a center of rotation of the camera assembly, a second printed circuit board, at least a portion of which is disposed in the camera housing to face the first printed circuit board, a first wireless communication module disposed on at least a portion of the first printed circuit board, and a second wireless communication module disposed on at least a portion of the second printed circuit board, and the first wireless communication module and the second wireless communication module wirelessly transmit and/or receive a signal related to the camera module. Other embodiments may be provided.

20 Claims, 19 Drawing Sheets

(51) Int. Cl.
*H04N 23/54* (2023.01)
*H04N 23/57* (2023.01)
*H04N 23/68* (2023.01)

(58) Field of Classification Search
USPC .......................................................... 348/374
See application file for complete search history.

(56) References Cited

U.S. PATENT DOCUMENTS

| | | | |
|---|---|---|---|
| 9,420,183 B2 | 8/2016 | Hwang et al. | |
| 9,810,918 B2 | 11/2017 | Minamisawa | |
| 10,198,673 B2 | 2/2019 | Hibino et al. | |
| 10,404,919 B2 | 9/2019 | Yu | |
| 10,527,866 B2 | 1/2020 | Chung et al. | |
| 11,553,134 B2 * | 1/2023 | Ishikawa | H04N 23/687 |
| 2011/0122267 A1 | 5/2011 | Ahn et al. | |
| 2013/0324044 A1 | 12/2013 | Kuroda et al. | |
| 2014/0160311 A1 | 6/2014 | Hwang et al. | |
| 2015/0277140 A1 | 10/2015 | Minamisawa | |
| 2016/0344919 A1 | 11/2016 | Cho et al. | |
| 2017/0324905 A1 | 11/2017 | Yu | |
| 2017/0339346 A1 | 11/2017 | Chung et al. | |
| 2017/0372176 A1 * | 12/2017 | Hibino | H04N 23/51 |
| 2018/0180900 A1 | 6/2018 | Chung et al. | |
| 2019/0219892 A1 | 7/2019 | Park et al. | |
| 2020/0012068 A1 * | 1/2020 | Lim | H05K 1/181 |
| 2020/0322523 A1 * | 10/2020 | Kawase | H04N 23/51 |
| 2021/0176399 A1 | 6/2021 | Byon et al. | |
| 2021/0251078 A1 * | 8/2021 | Du | H04N 23/52 |
| 2021/0321024 A1 | 10/2021 | Song | |
| 2023/0072780 A1 * | 3/2023 | Yu | G01R 33/072 |

FOREIGN PATENT DOCUMENTS

| | | |
|---|---|---|
| JP | 2018-006861 | 1/2018 |
| JP | 2019-530899 A | 10/2019 |
| KR | 10-2011-0050210 | 5/2011 |
| KR | 10-2014-0020911 | 2/2014 |
| KR | 10-2015-0080367 | 7/2015 |
| KR | 2016-0137330 A | 11/2016 |
| KR | 2017-0130148 A | 11/2017 |
| KR | 10-2018-0076790 | 7/2018 |
| KR | 10-2021-0071253 | 6/2021 |
| WO | 2020/045960 | 3/2020 |

* cited by examiner

CAMERA MODULE AND ELECTRONIC DEVICE COMPRISING SAME

CROSS-REFERENCE TO RELATED APPLICATIONS

This application is a continuation of International Application No. PCT/KR2021/003245 filed Mar. 16, 2021 designating the United States, in the Korean Intellectual Property Receiving Office, and claiming priority to Korean Patent Application No. 10-2020-0032243, filed on Mar. 16, 2020, in the Korean Intellectual Property Office, the disclosures of which are all hereby incorporated by reference herein in their entireties.

FIELD

Example embodiments described herein relate to a camera module and/or an electronic device including the same.

BACKGROUND

An electronic device may include at least one camera module. The camera module may include an auto focus function that provides an auto focus function by moving a lens in the direction of an optical axis. The electronic device may include a function of compensating for shaking of the camera module. For example, to compensate for vibration applied to the camera module, the function of compensating for shake may allow the lens to move in a direction other than the direction of the optical axis.

SUMMARY

The camera module may support various functions. For example, the camera module may include at least one of a function related to image stabilization or a function related to auto focus. For example, when the camera module performs the function related to the image stabilization, only the lens may be moved or rotated, and an image sensor may be fixed. Therefore, the quality of an obtained image may be deteriorated.

According to example embodiments, an electronic device may include a camera module that includes an auto focus function of moving a lens in the direction of an optical axis and/or a function of rotating the lens about at least two axes.

In addition, according to example embodiments, the camera module may include a wireless communication module for wirelessly transmitting and/or receiving a signal.

A camera module according to an example embodiment may include a camera housing, a camera assembly, at least a portion of which is accommodated in the camera housing, the camera assembly including a lens, an image sensor, and a first printed circuit board (PCB), and the camera assembly being coupled, directly or indirectly, to the camera housing so as to be rotatable about a center of rotation of the camera assembly, a second printed circuit board, at least a portion of which is disposed in the camera housing to face the first printed circuit board, a first wireless communication module, comprising communication circuitry, disposed on, directly or indirectly, at least a portion of the first printed circuit board, and a second wireless communication module, comprising communication circuitry, disposed on, directly or indirectly, at least a portion of the second printed circuit board, and the first wireless communication module and the second wireless communication module wirelessly transmit and/or receive a signal related to the camera module.

An electronic device according to an example embodiment may include a housing in which at least a portion of a camera module is disposed. The camera module may include a camera housing, a camera assembly, at least a portion of which is accommodated in the camera housing, the camera assembly including a lens, an image sensor, and a first printed circuit board, a second printed circuit board, at least a portion of which is disposed in the camera housing to face the first printed circuit board, the second printed circuit board being electrically connected with a third printed circuit board disposed in the housing, a first wireless communication module disposed on, directly or indirectly, the first printed circuit board, a second wireless communication module disposed on, directly or indirectly, the second printed circuit board such that at least a portion faces the first wireless communication module, in which the first wireless communication module and the second wireless communication module wirelessly transmit and/or receive a signal related to the camera module, at least one cable that electrically connects the first printed circuit board and the second printed circuit board and supplies power to the camera module, and a guide plate connected to the camera assembly and/or the camera housing such that the camera assembly is rotatable about at least one rotational axis substantially perpendicular or parallel to an optical axis of the lens. The signal related to the camera module includes an image-related signal generated from the image sensor.

The camera module according to example embodiments may provide a function related to auto focus and a function related to image stabilization. In addition, the camera module according to the example embodiments may transmit and/or receive a signal in a wireless communication scheme. Accordingly, the size of the camera module may be reduced, and the operational performance of the camera module for the image stabilization function may be improved.

In addition, the disclosure may provide various effects that are directly or indirectly recognized.

BRIEF DESCRIPTION OF DRAWINGS

The above and other aspects, features, and advantages of certain embodiments will be more apparent from the following detailed description, taken in conjunction with the accompanying drawings, in which.

With regard to description of the drawings, identical or similar reference numerals may be used to refer to identical or similar components.

DETAILED DESCRIPTION

Hereinafter, various example embodiments may be described with reference to accompanying drawings. Accordingly, those of ordinary skill in the art will recognize that modification, equivalent, and/or alternative on the various embodiments described herein can be variously made without departing from the scope and spirit of the disclosure.

Figure 1:
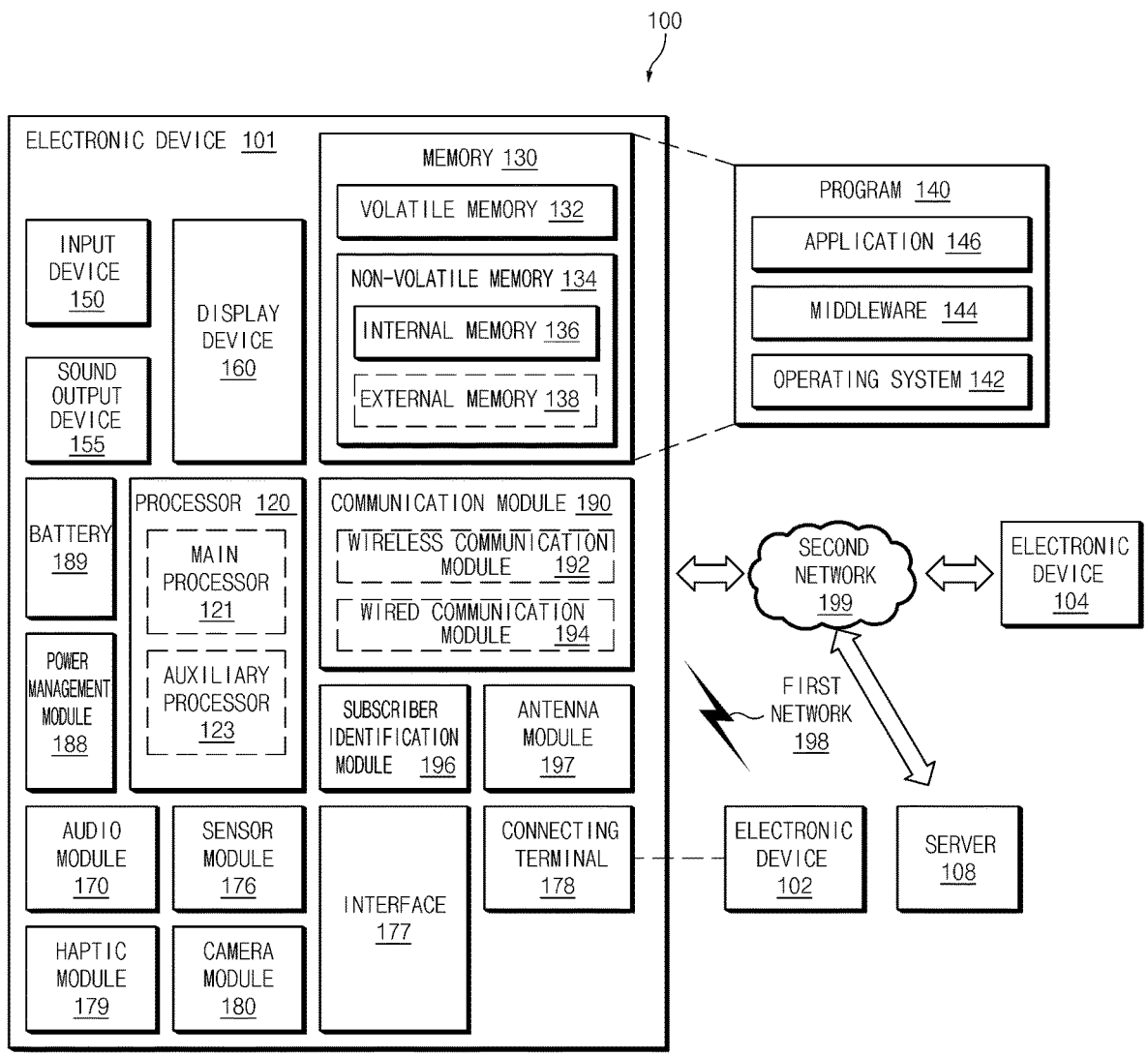
FIG. 1 is a block diagram illustrating an electronic device in a network environment according to various example embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)).

These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
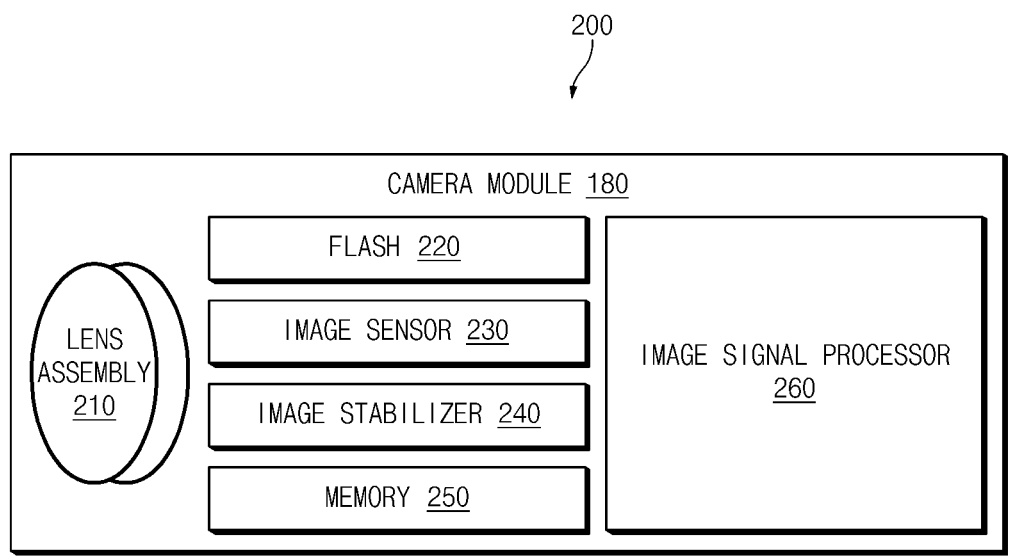
FIG. 2 is a block diagram illustrating the camera module according to various example embodiments.

FIG. 2 is a block diagram 200 illustrating the camera module 180 according to various embodiments. Referring to FIG. 2, the camera module 180 may include a lens assembly 210, a flash 220, an image sensor 230, an image stabilizer 240, memory 250 (e.g., buffer memory), or an image signal processor 260. The lens assembly 210 may collect light emitted or reflected from an object whose image is to be taken. The lens assembly 210 may include one or more lenses. According to an embodiment, the camera module 180 may include a plurality of lens assemblies 210. In such a case, the camera module 180 may form, for example, a dual camera, a 360-degree camera, or a spherical camera. Some of the plurality of lens assemblies 210 may have the same lens attribute (e.g., view angle, focal length, auto-focusing, f number, or optical zoom), or at least one lens assembly may have one or more lens attributes different from those of another lens assembly. The lens assembly 210 may include, for example, a wide-angle lens or a telephoto lens.

The flash 220 may emit light that is used to reinforce light reflected from an object. According to an embodiment, the flash 220 may include one or more light emitting diodes (LEDs) (e.g., a red-green-blue (RGB) LED, a white LED, an infrared (IR) LED, or an ultraviolet (UV) LED) or a xenon lamp. The image sensor 230 may obtain an image corresponding to an object by converting light emitted or reflected from the object and transmitted via the lens assembly 210 into an electrical signal. According to an embodiment, the image sensor 230 may include one selected from image sensors having different attributes, such as a RGB sensor, a black-and-white (BW) sensor, an IR sensor, or a UV sensor, a plurality of image sensors having the same attribute, or a plurality of image sensors having different attributes. Each image sensor included in the image sensor 230 may be implemented using, for example, a charged coupled device (CCD) sensor or a complementary metal oxide semiconductor (CMOS) sensor.

The image stabilizer 240 may move the image sensor 230 or at least one lens included in the lens assembly 210 in a particular direction, or control an operational attribute (e.g., adjust the read-out timing) of the image sensor 230 in response to the movement of the camera module 180 or the electronic device 101 including the camera module 180. This allows compensating for at least part of a negative effect (e.g., image blurring) by the movement on an image being captured. According to an embodiment, the image stabilizer 240 may sense such a movement by the camera module 180 or the electronic device 101 using a gyro sensor (not shown) or an acceleration sensor (not shown) disposed inside or outside the camera module 180. According to an embodiment, the image stabilizer 240 may be implemented, for example, as an optical image stabilizer.

The memory 250 may store, at least temporarily, at least part of an image obtained via the image sensor 230 for a subsequent image processing task. For example, if image capturing is delayed due to shutter lag or multiple images are quickly captured, a raw image obtained (e.g., a Bayer-patterned image, a high-resolution image) may be stored in the memory 250, and its corresponding copy image (e.g., a low-resolution image) may be previewed via the display module 160. Thereafter, if a specified condition is met (e.g., by a user's input or system command), at least part of the raw image stored in the memory 250 may be obtained and processed, for example, by the image signal processor 260. According to an embodiment, the memory 250 may be configured as at least part of the memory 130 or as a separate memory that is operated independently from the memory 130.

The image signal processor 260 may perform one or more image processing with respect to an image obtained via the image sensor 230 or an image stored in the memory 250. The one or more image processing may include, for example, depth map generation, three-dimensional (3D) modeling, panorama generation, feature point extraction, image synthesizing, or image compensation (e.g., noise reduction, resolution adjustment, brightness adjustment, blurring, sharpening, or softening). Additionally or alternatively, the image signal processor 260 may perform control (e.g., exposure time control or read-out timing control) with respect to at least one (e.g., the image sensor 230) of the components included in the camera module 180. An image processed by the image signal processor 260 may be stored back in the memory 250 for further processing, or may be provided to an external component (e.g., the memory 130, the display module 160, the electronic device 102, the electronic device 104, or the server 108) outside the camera module 180. According to an embodiment, the image signal processor 260 may be configured as at least part of the processor 120, or as a separate processor that is operated independently from the processor 120. If the image signal processor 260 is configured as a separate processor from the processor 120, at least one image processed by the image signal processor 260 may be displayed, by the processor 120, via the display module 160 as it is or after being further processed.

According to an embodiment, the electronic device 101 may include a plurality of camera modules 180 having different attributes or functions. In such a case, at least one of the plurality of camera modules 180 may form, for example, a wide-angle camera and at least another of the plurality of camera modules 180 may form a telephoto camera. Similarly, at least one of the plurality of camera modules 180 may form, for example, a front camera and at least another of the plurality of camera modules 180 may form a rear camera.

Figure 3A:
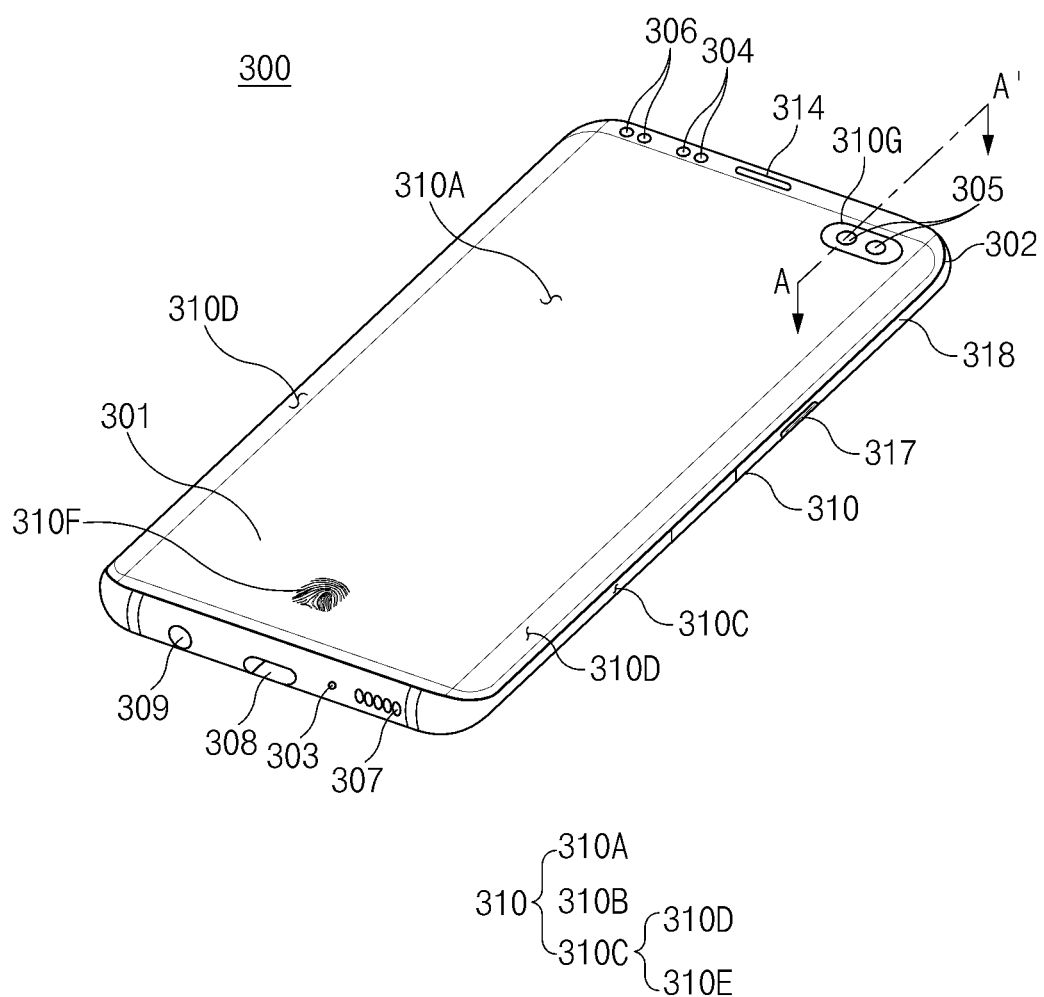
FIG. 3A is a front perspective view of an electronic device according to an example embodiment.
Figure 3B:
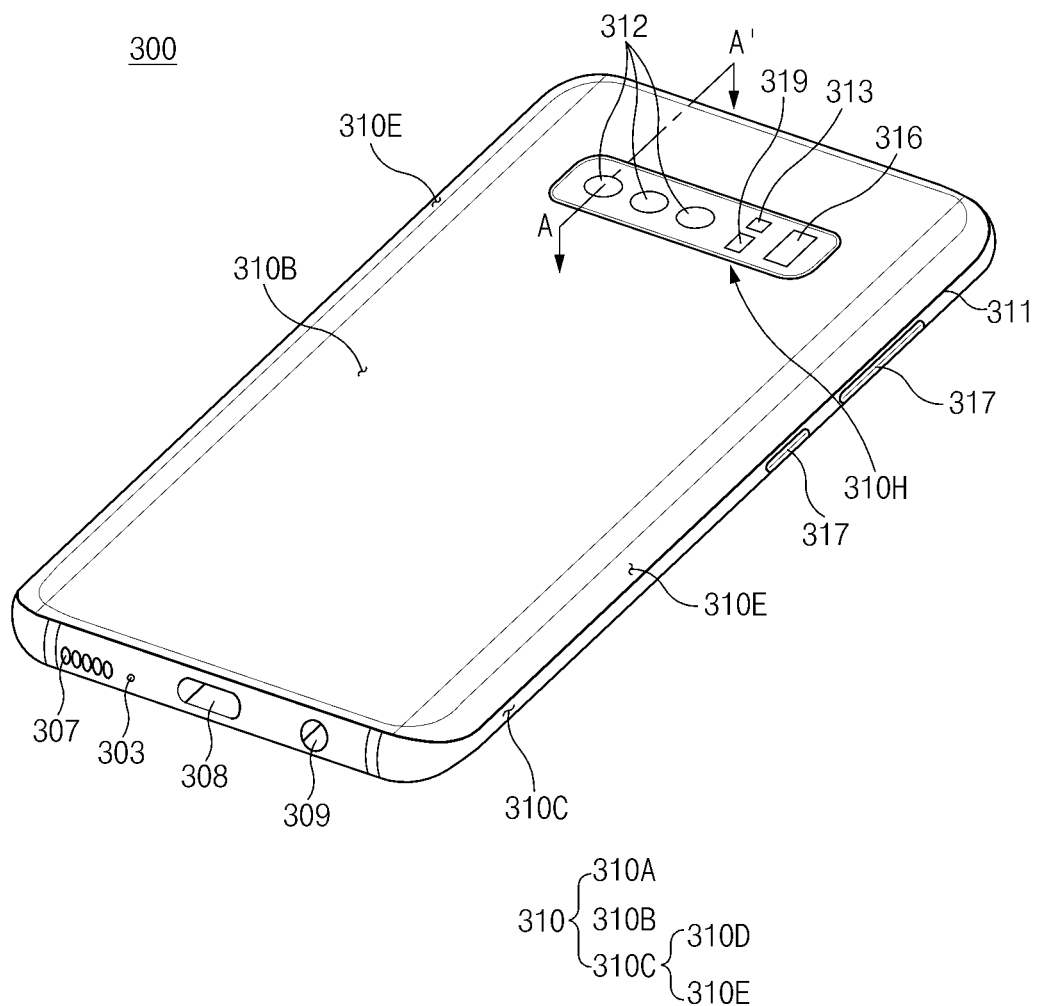
FIG. 3B is a rear perspective view of the electronic device according to an example embodiment.
Figure 3C:
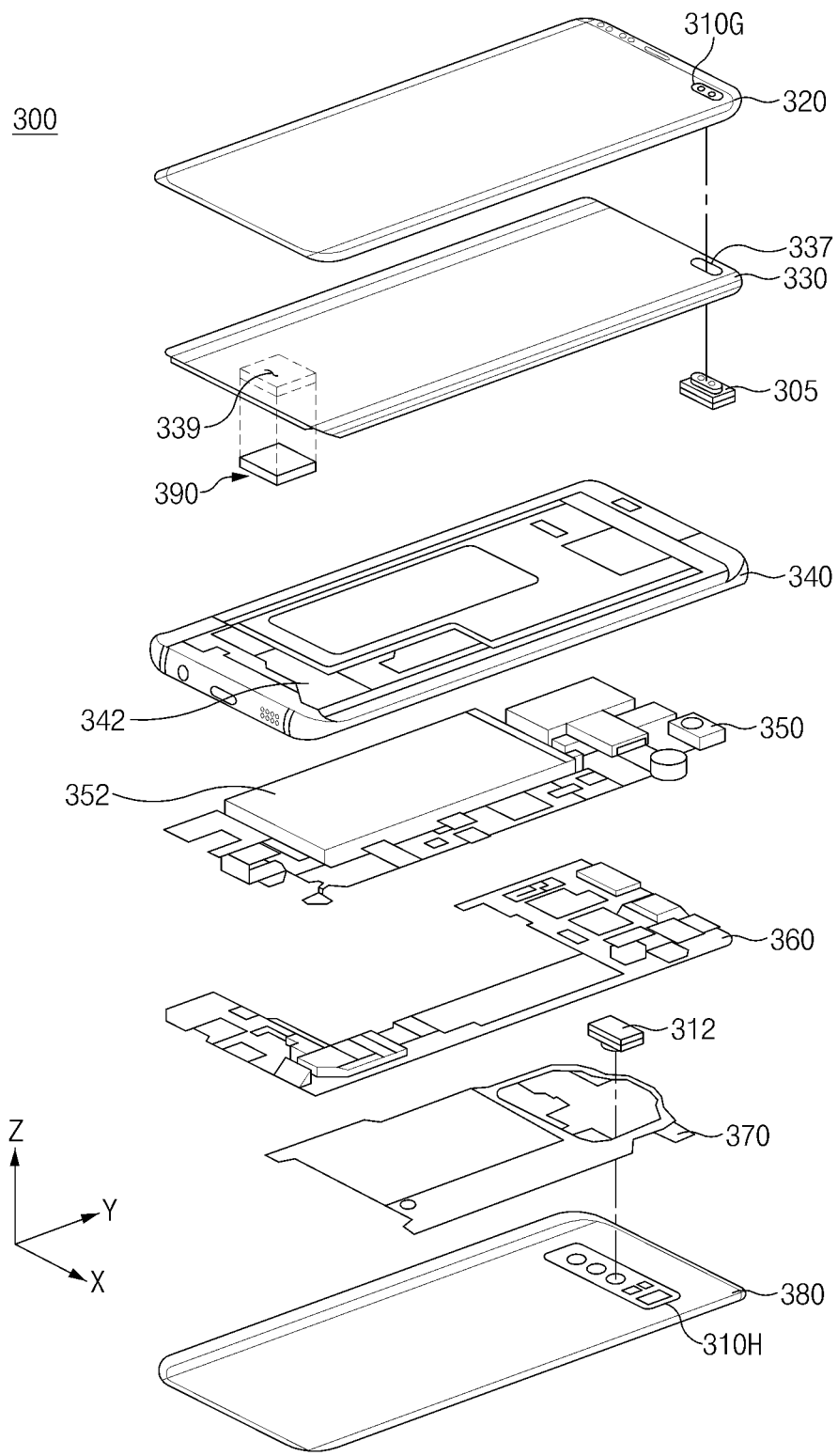
FIG. 3C is an exploded perspective view of the electronic device according to an example embodiment.

FIG. 3A is a front perspective view of an electronic device according to an embodiment. FIG. 3B is a rear perspective view of the electronic device according to an embodiment. FIG. 3C is an exploded perspective view of the electronic device according to an embodiment. Each embodiment herein may be used in combination with any other embodiment described herein.

Referring to FIGS. 3A to 3C, the electronic device 300 according to an embodiment may include a housing 310 that includes a first surface (or, a front surface) 310A, a second surface (or, a rear surface) 310B, and a side surface 310C surrounding a space between the first surface 310A and the second surface 310B.

In another embodiment (not illustrated), the housing 310 may refer to a structure that forms some of the first surface 310A, the second surface 310B, and the side surface 310C of FIG. 1.

According to an embodiment, the first surface 310A may be formed by a front plate 302, at least a portion of which is substantially transparent (e.g., a glass plate including various coating layers, or a polymer plate). The second surface 310B may be formed by a back plate 311 that is substantially opaque. The back plate 311 may be formed of, for example, coated or colored glass, ceramic, a polymer, metal (e.g., aluminum, stainless steel (STS), or magnesium), or a combination of at least two of the aforementioned materials. The side surface 310C may be formed by a side bezel structure (or, a "frame structure") 318 that is coupled, directly or indirectly, with the front plate 302 and the back plate 311 and that contains metal and/or a polymer.

In some embodiments, the back plate 311 and the side bezel structure 318 may be integrally formed with each other and may contain the same material (e.g., a metallic material such as aluminum).

In the illustrated embodiment, the front plate 302 may include, at opposite long edges thereof, two first areas 310D that curvedly and seamlessly extend from the first surface 310A toward the back plate 311.

In the illustrated embodiment (refer to FIG. 2), the back plate 311 may include, at opposite long edges thereof, two second areas 310E that curvedly and seamlessly extend from the second surface 310B toward the front plate 302.

In some embodiments, the front plate 302 (or, the back plate 311) may include only one of the first areas 310D (or, the second areas 310E). In another embodiment, the front plate 302 (or, the back plate 311) may not include a part of the first areas 310D (or, the second areas 310E).

In the embodiments, when viewed from a side of the electronic device 300, the side bezel structure 318 may have a first thickness (or, width) at sides (e.g., short sides) not including the first areas 310D or the second areas 310E and may have a second thickness at sides (e.g., long sides) including the first areas 310D or the second areas 310E, the second thickness being smaller than the first thickness.

According to an embodiment, the electronic device 300 may include at least one of a display 301, audio modules 303, 307, and 314 (e.g., the audio module 170 of FIG. 1), sensor modules 304, 316, and 319 (e.g., the sensor module 176 of FIG. 1), camera modules 305 and 312 (e.g., the camera module 180 of FIG. 1), key input devices 317 (e.g., the input device 150 of FIG. 1), a light emitting element 306, or connector holes 308 and 309 (e.g., the connecting terminal 178 of FIG. 1). In some embodiments, the electronic device 300 may not include at least one component (e.g., the key input devices 317 or the light emitting elements 306) among the aforementioned components, or may additionally include other component(s).

The display 301, for example, may be exposed through most of the front plate 302. In some embodiments, at least a portion of the display 301 may be exposed through the front plate 302 that includes the first surface 310A and the first areas 310D of the side surface 310C.

In some embodiments, the periphery of the display 301 may be formed to be substantially the same as the shape of the adjacent outside edge of the front plate 302. In another embodiment (not illustrated), to expand the area by which the display 301 is exposed, the gap between the outside edge of the display 301 and the outside edge of the front plate 302 may be formed to be substantially constant.

In an embodiment, a surface of the housing 310 (or, the front plate 302) may include a screen display area that is formed as the display 301 is visually exposed. For example, the screen display area may include the first surface 310A and the first areas 310D of the side surface.

In an embodiment, the screen display area 310A and 310D may include a sensing area 310F configured to obtain biometric information of a user. Here, when the screen display area 310A and 310D includes the sensing area 310F, this may indicate that at least a portion of the sensing area 310A overlaps the screen display area 310A and 310D. For example, the sensing area 310F may refer to an area capable of displaying visual information by the display 301 like the other areas of the screen display area 310A and 310D and additionally obtaining the user's biometric information (e.g., fingerprint).

In an embodiment, the screen display area 310A and 310D of the display 301 may include an area 310G through which the first camera module 305 (e.g., a punch hole camera) is visually exposed. For example, at least a portion of the periphery of the area 310G through which the first camera module 305 is exposed may be surrounded by the screen display area 310A and 310D. In various embodiments, the first camera module 305 may include a plurality of camera modules (e.g., the camera module 180 of FIG. 1).

In another embodiment (not illustrated), a recess or opening may be formed in a portion of the screen display area 310A and 310D of the display 301, and the electronic device 300 may include at least one of the audio module 314, the first sensor module 304, or the light emitting element 306 that is aligned with the recess or opening.

In another embodiment (not illustrated), the display 301 may include, on a rear surface of the screen display area 310A and 310D, at least one of the audio module 314, the sensor modules 304, 316, and 319, or the light emitting element 306.

In another embodiment (not illustrated), the display 301 may be coupled with, or disposed adjacent to, touch detection circuitry, a pressure sensor capable of measuring the intensity (pressure) of a touch, and/or a digitizer that detects a stylus pen of a magnetic field type.

In some embodiments, at least a part of the sensor modules 304, 316, and 319 and/or at least a part of the key input devices 317 may be disposed on the side surface 310C (e.g., the first areas 310D and/or the second areas 310E).

The audio modules 303, 307, and 314 may include the microphone hole 303 and the speaker holes 307 and 314. A microphone for obtaining external sound may be disposed in the microphone hole 303, and in some embodiments, a plurality of microphones may be disposed in the microphone hole 303 to sense the direction of sound. The speaker holes 307 and 314 may include the external speaker hole 307 and the receiver hole 314 for telephone call. In some embodiments, the speaker holes 307 and 314 and the microphone hole 303 may be implemented as a single hole, or without the speaker holes 307 and 314, a speaker may be included (e.g., a piezoelectric speaker).

The sensor modules 304, 316, and 319 may generate an electrical signal or a data value that corresponds to an operational state inside the electronic device 300 or an environmental state external to the electronic device 300. For example, the sensor modules 304, 316, and 319 may include the first sensor module 304 (e.g., a proximity sensor) disposed on, directly or indirectly, the first surface 310A of the housing 310, the second sensor module 316 (e.g., a TOF camera) disposed on the second surface 310B of the housing 310, the third sensor module 319 (e.g., an HRM sensor)

disposed on the second surface 310B of the housing 310, and/or a fourth sensor module 338 (e.g., a fingerprint sensor) coupled, directly or indirectly, to the display 301.

In various embodiments, the second sensor module 316 may include a TOF camera for measuring a distance.

In various embodiments, at least a portion of the fourth sensor module 338 may be disposed under the screen display area 310A and 310D. For example, the fourth sensor module may be disposed in a recess 339 formed on a rear surface of the display 301. For example, the fourth sensor module 338 may not be exposed through the screen display area 310A and 310D and may form the sensing area 310F in at least a portion of the screen display area 310A and 310D. In some embodiments (not illustrated), the fingerprint sensor may be disposed on, directly or indirectly, the second surface 310B as well as the first surface 310A of the housing 310 (e.g., the screen display area 310A and 310D).

In various embodiments, the electronic device 300 may further include a non-illustrated sensor module, for example, at least one of a gesture sensor, a gyro sensor, an atmospheric pressure sensor, a magnetic sensor, an acceleration sensor, a grip sensor, a color sensor, an infrared (IR) sensor, a biosensor, a temperature sensor, a humidity sensor, or an illuminance sensor.

The camera modules 305 and 312 may include the first camera module 305 (e.g., a punch hole camera) exposed on the first surface 310A of the electronic device 300, the second camera module 312 exposed on the second surface 310B, and/or a flash 313.

In an embodiment, the first camera module 305 may be exposed through a portion of the screen display area 310D of the first surface 310A. For example, the first camera module 305 may be exposed on a partial region of the screen display area 310D through an opening (not illustrated) that is formed in a portion of the display 301.

In an embodiment, the second camera module 312 may include a plurality of camera modules (e.g., a dual camera or a triple camera). However, the second camera module 312 is not necessarily limited to including the plurality of camera modules and may include one camera module.

The camera modules 305 and 312 may include one or more lenses, an image sensor, and/or an image signal processor. The flash 313 may include, for example, a light emitting diode or a xenon lamp. In some embodiments, two or more lenses (an IR camera lens, a wide angle lens, and a telephoto lens) and image sensors may be disposed on, directly or indirectly, a surface of the electronic device 300.

The key input devices 317 may be disposed on, directly or indirectly, the side surface 310C of the housing 310. In another embodiment, the electronic device 300 may not include all or some of the aforementioned key input devices 317, and the key input devices 317 not included may be implemented in a different form, such as a soft key, on the display 301. In some embodiments, the key input devices may include the fourth sensor module 338 that forms the sensing area 310F included in the screen display area 310A and 310D.

The light emitting element 306, for example, may be disposed on the first surface 310A of the housing 310. The light emitting element 306, for example, may provide state information of the electronic device 300 in the form of light. In another embodiment, the light emitting element 306 may provide, for example, a light source that operates in conjunction with operation of the first camera module 305. The light emitting element 306 may include, for example, an LED, an IR LED, and/or a xenon lamp.

The connector holes 308 and 309 may include the first connector hole 308 capable of accommodating a connector (e.g., a USB connector) for transmitting and receiving power and/or data with an external electronic device, and/or the second connector hole 309 (e.g., an earphone jack) capable of accommodating a connector for transmitting and receiving audio signals with an external electronic device.

Referring to FIG. 3C, the electronic device 300 may include a front plate 320 (e.g., the front surface 310A and the first areas 310D of FIG. 3A), a display 330 (e.g., the display 301 of FIG. 3A), a bracket 340 (e.g., a portion of the side surface 310C of FIG. 3A), a first support member 342 (e.g., a plate structure), a printed circuit board 350, a battery 359, a rear case 360, an antenna 370, and a back plate 380 (e.g., the rear surface 310B and the second areas 310E of FIG. 3A).

In some embodiments, the electronic device 300 may not include at least one component (e.g., the first support member 342 or the rear case 360) among the components, or may additionally include other component(s). At least one of the components of the electronic device 300 may be identical or similar to at least one of the components of the electronic device 300 of FIG. 3A or 3B, and repetitive descriptions will hereinafter be omitted.

The first support member 342 may be disposed in the electronic device 300 and may be connected, directly or indirectly, with the bracket 340, or may be integrally formed with the bracket 340. The first support member 342 may be formed of, for example, a metallic material and/or a non-metallic (e.g., polymer) material. The display 330 may be coupled, directly or indirectly, to a surface of the first support member 342, and the printed circuit board 350 may be coupled, directly or indirectly, to an opposite surface of the first support member 342. The printed circuit board 350 may have a processor, memory, and/or an interface mounted thereon. The processor may include, for example, one or more of a central processing unit, an application processor, a graphic processing unit, an image signal processor, a sensor hub processor, or a communication processor.

The memory may include, for example, volatile memory or nonvolatile memory.

The interface may include, for example, a high definition multimedia interface (HDMI), a universal serial bus (USB) interface, an SD card interface, and/or an audio interface. For example, the interface may electrically or physically connect the electronic device 300 with an external electronic device and may include a USB connector, an SD card/MMC connector, or an audio connector.

The battery 359, which is a device for supplying power to at least one component of the electronic device 300, may include, for example, a primary cell that is not rechargeable, a secondary cell that is rechargeable, or a fuel cell. At least a portion of the battery 359, for example, may be disposed on substantially the same plane as the printed circuit board 350. The battery 359 may be integrally disposed inside the electronic device 300, or may be disposed to be detachable from the electronic device 300.

The antenna 370 may be disposed between the back plate 380 and the battery 359. The antenna 370 may include, for example, a near field communication (NFC) antenna, a wireless charging antenna, and/or a magnetic secure transmission (MST) antenna. For example, the antenna 370 may perform short range communication with an external device, or may wirelessly transmit and receive power required for charging. In another embodiment, an antenna structure may be formed by the bracket 340 and/or a portion of the first support member 342, or a combination thereof.

In various embodiments, the camera module 305 may be disposed in the housing 310 such that a lens is exposed through the camera area 310G of the front surface 310A of the electronic device 300. For example, the camera area 310G may be formed in the first plate 320. For example, the camera module 305 may include a punch hole camera disposed in a hole or recess 337 formed in a rear surface of the display 330.

In various embodiments, the camera module 312 may be disposed in the housing 310 such that a lens is exposed through a camera area 310H of the rear surface 310B of the electronic device 300. For example, the camera module 312 may be disposed on, directly or indirectly, the printed circuit board 350.

Figure 4:
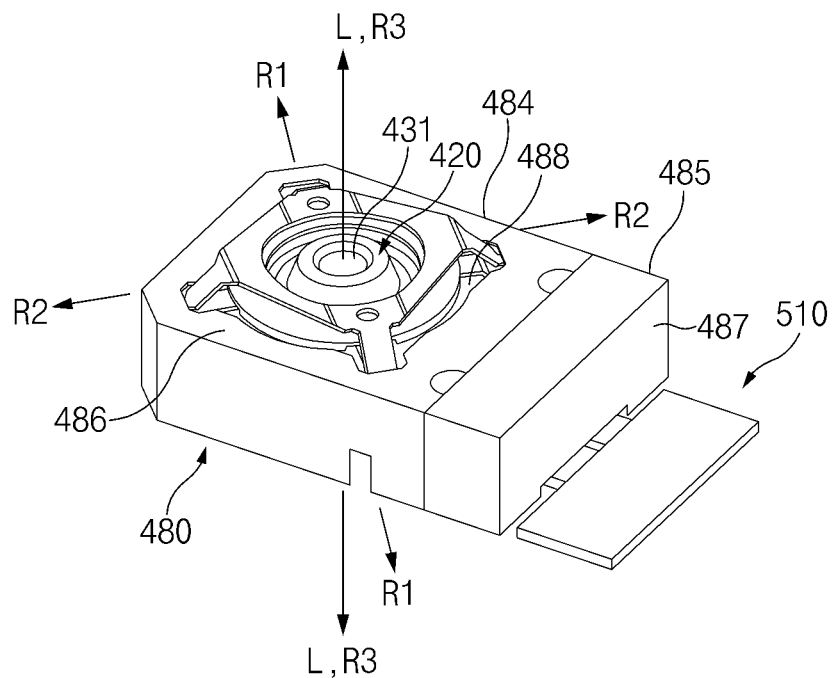
FIG. 4 is a perspective view of a camera module according to an example embodiment.
Figure 4:
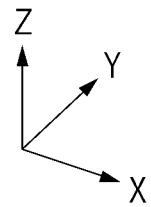

FIG. 4 is a perspective view of a camera module according to an embodiment.

Referring to FIG. 4, the camera module 400 (e.g., the camera module 180 of FIG. 2 and the camera modules 305 and 312 of FIG. 3) may include a camera assembly 420, a second camera housing 480, and a second printed circuit board 510.

In an embodiment, the second camera housing 480 may form a portion of an outer surface of the camera module 400. The second camera housing 480 may accommodate at least a portion of the camera assembly 420 in an inner space of the second camera housing 480. In various embodiments, the second camera housing 480 may be fixed and/or coupled, directly or indirectly, to a partial area of a third printed circuit board (e.g., the printed circuit board 350 of FIG. 3) of an electronic device (e.g., the electronic device 300 of FIG. 3) and may be disposed in a housing of the electronic device 300 (e.g., the housing 310 of FIG. 3). In various embodiments, the second camera housing 480 may be a structure included in the electronic device 300.

In an embodiment, the second camera housing 480 may at least partially accommodate the camera assembly 420 or a guide plate 450, 460, and 470 therein. In an embodiment, the second camera housing 480 may include an upper surface 486 through which at least a portion of the camera assembly 420 or at least a portion of the guide plate 450, 460, and 470 is exposed outside the second camera housing 480, and a side surface 487 extending from the upper surface 486. For example, the side surface 487 may extend substantially in the −Z-axis direction from the periphery of the upper surface 486.

In an embodiment, the upper surface 486 may have a first opening 488 formed in one area thereof. At least a portion of the camera assembly 420 or the guide plate 450, 460, and 470 may be exposed outside the second camera housing 480 through the first opening 488.

In an embodiment, the side surface 487 may have a second opening 489 formed in one area thereof. At least a portion of the second printed circuit board 510 may extend into the inner space of the second camera housing 480 through the second opening 489. For example, the second opening 489 may be formed in a shape corresponding to at least a portion of the second printed circuit board 510.

In an embodiment, at least a portion of the camera assembly 420 may be disposed in the second camera housing 480. For example, a portion of the camera assembly 420 may be visible from the outside through the first opening 488 formed in the second camera housing 480. In an embodiment, the camera assembly 420 may be configured to be rotatable in the second camera housing 480 about at least one rotational axis R1, R2, and R3 substantially perpendicular or parallel to an optical axis L of a lens 431.

In the illustrated embodiment, the first rotational axis R1 and the second rotational axis R2 substantially perpendicular to the optical axis L of the lens 431 may be defined, and the third rotational axis R3 substantially parallel to the optical axis L or located on the same line as the optical axis L may be defined. In this case, the first rotational axis R1 and the second rotational axis R2 may be substantially perpendicular to each other, and the third rotational axis R3 may be substantially perpendicular to the first rotational axis R1 and/or the second rotational axis R2.

In an embodiment, each of the first rotational axis R1 and the second rotational axis R2 may be substantially perpendicular to the optical axis L of the lens 431 and may extend to cross the optical axis L of the lens 431 at one point. For example, the first rotational axis R1 and the second rotational axis R2 may meet each other at one point through which the optical axis L of the lens 431 passes. In this case, the one point may be a center of rotation of the camera assembly 420 (e.g., a center of rotation C of FIGS. 11 and 12).

In various embodiments, the camera assembly 420 may rotate about at least one of the first rotational axis R1, the second rotational axis R2, or the third rotational axis R3 relative to the second camera housing 480. Accordingly, the camera module 400 may perform an image stabilization function. For example, the camera module 400 may perform a shake compensation function (e.g., an image stabilization function) by rotating the camera assembly 420 about each of the plurality of rotational axes R1, R2, and R3.

In an embodiment, at least a portion of the second printed circuit board 510 may be disposed outside the second camera housing 480. In various embodiments, the second printed circuit board 510 may extend toward the inner space of the second camera housing 480. For example, at least a portion of the second printed circuit board 510 may be disposed inside the second camera housing 480, and another portion may be disposed outside the second camera housing 480 so as to be electrically connected, directly or indirectly, with the third printed circuit board (e.g., the printed circuit board 350 of FIG. 3) on which a processor (e.g., the processor 120 of FIG. 1) of the electronic device (e.g., the electronic device 101 of FIG. 1 or the electronic device 300 of FIG. 3) is disposed. Each processor herein comprises processing circuitry.

Figure 5:
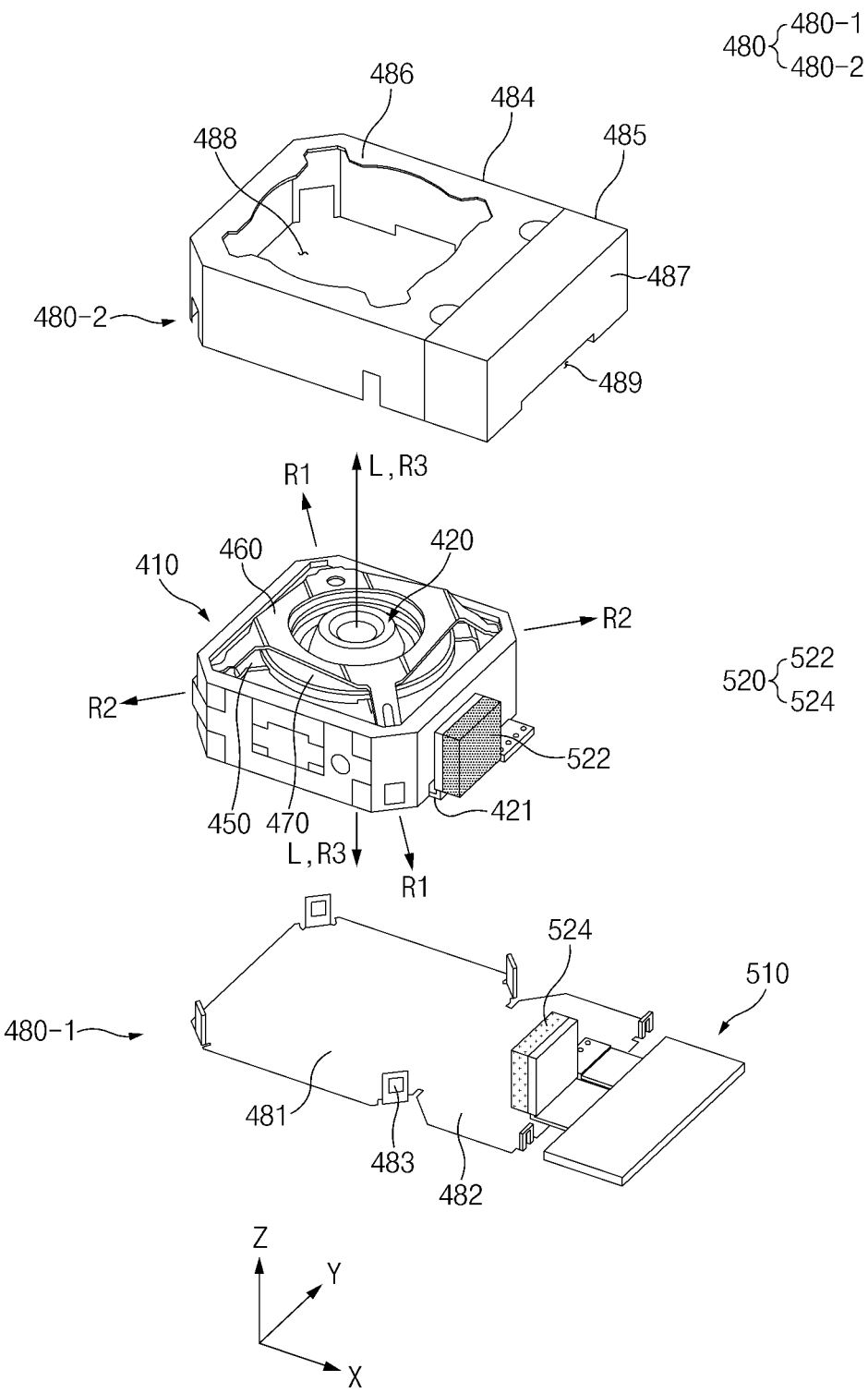
FIG. 5 is an exploded perspective view of the camera module according to an embodiment.

FIG. 5 is an exploded perspective view of the camera module according to an embodiment.

Referring to FIG. 5, the camera module 400 may include a camera housing 410 and 480, the camera assembly 420, the guide plate 450, 460, and 470, the second printed circuit board 510, and a wireless communication module 520 comprising communication circuitry.

In an embodiment, the camera housing 410 and 480 may include the first camera housing 410 that surrounds at least a portion of the camera assembly 420 and the second camera housing 480 that forms a portion of the outer surface of the camera module 400 and accommodates the first camera housing 410 and at least a portion of the camera assembly 420 therein.

In an embodiment, the first camera housing 410 may be disposed on at least a partial area of a base plate 480-1 included in the second camera housing 480. In an embodiment, the camera assembly 420 may be disposed in the first camera housing 410. In this case, the camera assembly 420 may be coupled, directly or indirectly, to the first camera housing 410 so as to be rotatable relative to the first camera housing 410.

In an embodiment, the second camera housing 480 may include the base plate 480-1 and a cover 480-2. In an embodiment, the base plate 480-1 and the cover 480-2 may be coupled, directly or indirectly, with each other to form an inner space in which the first camera housing 410 and the camera assembly 420 are accommodated.

In an embodiment, the base plate 480-1 may include a flat area (e.g., a first area 481 and a second area 482) on which the first camera housing 410, the second printed circuit board 510, and the wireless communication module 520 are disposed. For example, the flat area (e.g., the first area 481 and the second area 482) of the base plate 480-1 may face a first direction (e.g., the Z-axis direction).

In an embodiment, the base plate 480-1 may include the first area 481 on which the first camera housing 410 is disposed and the second area 482 on which at least a portion of the second printed circuit board 510 and at least a portion of the wireless communication module 520 are disposed. In various embodiments, the second area 482 may extend from the first area. For example, the second area 482 may extend substantially in the X-axis direction from one side of the first area 481.

In various embodiments, fixing members 483 for fixing the first camera housing 410 may be formed on corner portions of the first area 481 of the base plate 480-1. In various embodiments, the fixing members 483 may be formed on corners of the first area 481 that face the direction of the first rotational axis R1 and/or the direction of the second rotational axis R2. For example, the fixing members 483 may protrude in the +Z-axis direction from a surface of the first area 481. In this case, recesses 419 corresponding to the fixing members 483 may be formed on the first camera housing 410. In various embodiments, the first camera housing 410 may be fixed to the first area 481 through a coupling of the fixing members 483 and the recesses 419.

In an embodiment, the cover 480-2 may include a first cover 484 and a second cover 485 that cover the first area 481 and the second area 482 of the base plate 480-1, respectively. In an embodiment, the cover 480-2 may be coupled, directly or indirectly, with the base plate 480-1. For example, the cover 480-2 and the base plate 480-1 may be coupled such that the first cover 484 substantially faces the first area 481 and the second cover 485 substantially faces the second area 482.

In an embodiment, the first cover 484 and the first area 481 may form a space in which the first camera housing 410 is disposed. In various embodiments, the second cover 485 and the second area 482 may form a space in which at least a portion of the second printed circuit board 510 and at least a portion of the wireless communication module 520 are disposed.

In an embodiment, the first cover 484 may include the first opening 488. For example, the first opening 488 may be formed in the upper surface 486 of the first cover 484. In various embodiments, the lens 431 may be exposed outside the camera housing 410 and 480 through the first opening 488. In an embodiment, the second cover 485 may include the second opening 489. The second opening 489 may be formed in the side surface 489 of the second cover 485. At least a portion of the second printed circuit board 510 may be disposed in the second opening 489.

In various embodiments, the first cover 484 and the second cover 485 may be configured as substantially separate components and may be configured to be assembled to form the cover 480-2. However, the scope is not necessarily limited thereto, and in another example, the first cover 484 and the second cover 485 may be integrally formed with each other.

In an embodiment, the camera assembly 420 may be disposed in the first camera housing 410. In an embodiment, the camera assembly 420 may be coupled, directly or indirectly, to the first camera housing 410 so as to be rotatable about the rotational axes R1, R2, and R3. In various embodiments, the camera assembly 420 may rotate relative to the camera housing (e.g., the first camera housing 410 and the second camera housing 480).

For example, the camera assembly 420 may rotate about the rotational axes R1, R2, and R3 such that the optical axis L of the lens (e.g., the lens 431 of FIG. 4) forms a predetermined angle with the first direction (e.g., the Z-axis direction) perpendicular to the flat area of the second camera housing 480 (e.g., the first area 481 and the second area 482 of the base plate 480-1) (e.g., refer to FIGS. 10 and 11).

In an embodiment, the camera assembly 420 may include a first printed circuit board 421. In an embodiment, at least a portion of the first printed circuit board 421 may extend outside the first camera housing 410. In various embodiments, a first wireless communication module 522, comprising communication circuitry, may be disposed on, directly or indirectly, the portion of the first printed circuit board 421 that extends outside the first camera housing 410.

In an embodiment, the guide plate 450, 460, and 470 may be connected, directly or indirectly, with the first camera housing 410 and/or the camera assembly 420. In an embodiment, the guide plate 450, 460, and 470 may include the first guide plate 450, the second guide plate 460, and the third guide plate 470. For example, the first guide plate 450 may be connected to the camera assembly 420. The second guide plate 460 may be connected to the first camera housing 410. The third guide plate 470 may be connected to the first guide plate 450 and the second guide plate 460.

In various embodiments, the guide plate 450, 460, and 470 may guide the camera assembly 420 such that the camera assembly 420 rotates about the first rotational axis R1, the second rotational axis R2, and/or the third rotational axis R3. In various embodiments, at least a portion of the guide plate 450, 460, and 470 may be exposed outside the second camera housing 480 through the first opening 488.

In an embodiment, the second printed circuit board 510 may be disposed on, directly or indirectly, the second camera housing 480. For example, at least a portion of the second printed circuit board 510 may be disposed on the second area 482 of the base plate 480-1. In various embodiments, when the first camera housing 410 and the camera assembly 420 are disposed on the first area 481, the second printed circuit board 510 may be disposed on the second area 482 to at least partially face the first printed circuit board 421. For example, when the first wireless communication module 522 and a second wireless communication module 524, each comprising communication circuitry, are disposed on, directly or indirectly, the first printed circuit board 421 and the second printed circuit board 510, respectively, the first wireless communication module 522 and the second wireless communication module 524 may face each other.

In various embodiments, at least a portion of the second printed circuit board 510 may be accommodated in the second camera housing 480. For example, the at least a portion of the second printed circuit board 510 may be accommodated in the space formed by the second cover 480-2 and the second area 482. In this case, the second wireless communication module 524, comprising communication circuitry, may be disposed on the portion accommodated in the second camera housing 480.

In an embodiment, the wireless communication module 520 may include the first wireless communication module 522 and the second wireless communication module 524. In various embodiments, the wireless communication module 520 may be disposed outside the first camera housing 410. Furthermore, the wireless communication module 520 may be disposed inside the second camera housing 480. For example, the first wireless communication module 522 may be disposed on the first printed circuit board 421. For example, the second wireless communication module 524 may be disposed on the second printed circuit board 510. In various embodiments, the first wireless communication module 522 and the second wireless communication module 524 may be disposed to at least partially face each other.

In various embodiments, the first wireless communication module 522 may rotate relative to the second wireless communication module 524. For example, when the camera assembly 420 rotates, the second wireless communication module 524 may be fixed to the second camera housing 480, and the first wireless communication module 522, together with the camera assembly 420, may rotate relative to the camera housing (e.g., the first camera housing 410 and the second camera housing 480).

In various embodiments, the first wireless communication module 522 and the second wireless communication module 524 may wirelessly transmit and/or receive a signal related to the camera module 400. For example, the signal related to the camera module 400 may include at least one of a signal related to an image, a signal related to an auto focus function, or a signal related to an image stabilization function. The signal related to the camera module 400 is not limited to the example embodiments. In various embodiments, the signal related to the camera module 400 may further include various signals related to functions and/or operations of the camera module 400.

Figure 6:
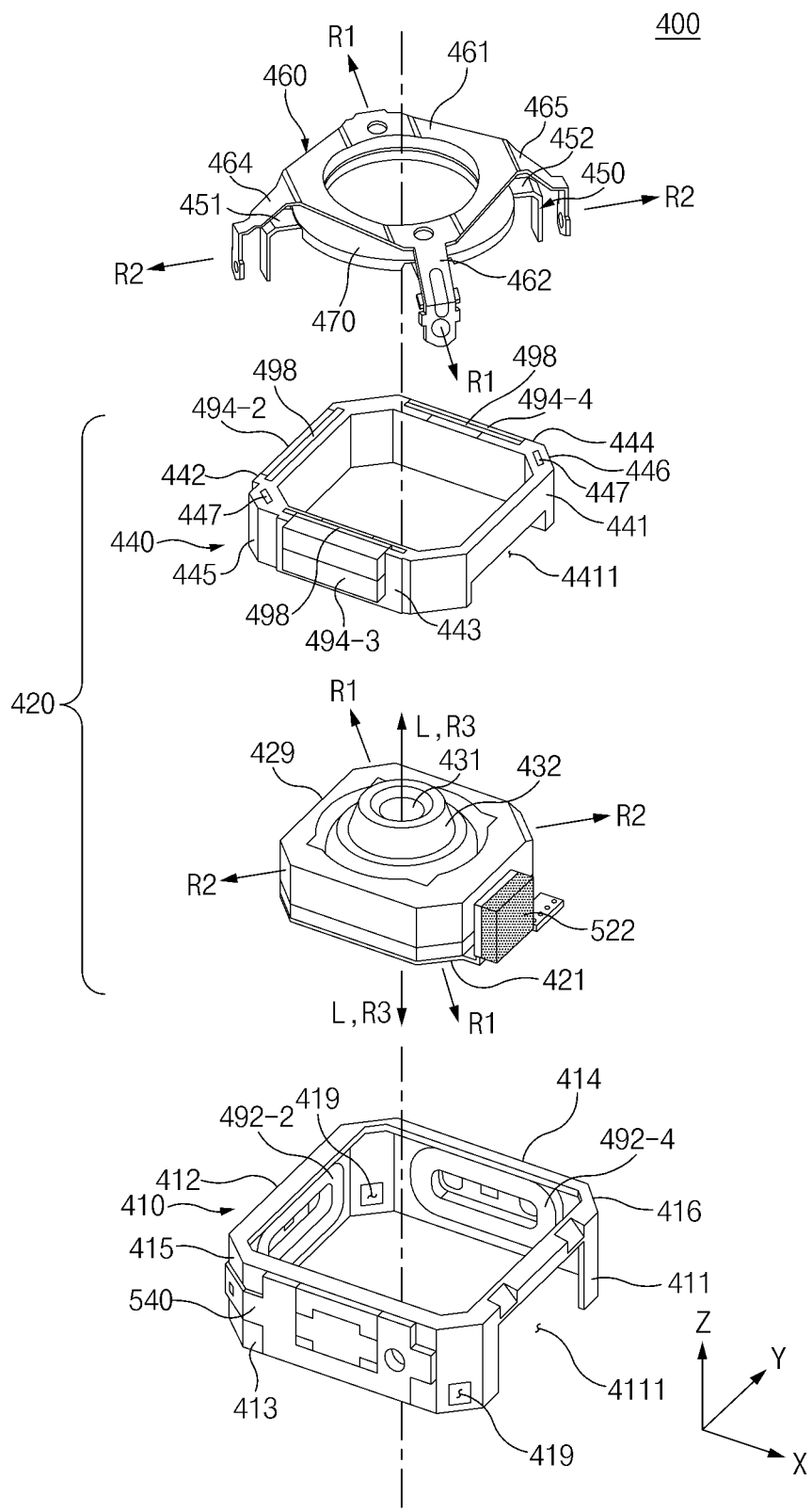
FIG. 6 is an exploded perspective view of a camera housing, a camera assembly, and a guide plate of the camera module according to an example embodiment.

FIG. 6 is an exploded perspective view of the camera housing, the camera assembly, and the guide plate of the camera module according to an embodiment. FIG. 6 may be a view in which the second camera housing, the second printed circuit board, and the second wireless communication module are omitted from FIG. 5.

Referring to FIG. 6, the camera module 400 may include the first camera housing 410, the camera assembly 420, and the guide plate 450, 460, and 470.

In an embodiment, the first camera housing 410 may include a plurality of side surfaces 411, 412, 423, and 414 to surround at least a portion of the camera assembly 420.

In an embodiment, the plurality of side surfaces 411, 412, 413, and 414 may include the first side surface 411 and the second side surface 412 substantially facing each other in the X-axis direction and the third side surface 413 and the fourth side surface 414 substantially facing each other in the Y-axis direction. The first side surface 411 and the second side surface 412 may be connected, directly or indirectly, by the third side surface 413 and the fourth side surface 414. Accordingly, an inner space in which the camera assembly 420 is disposed may be formed.

For example, the first side surface 411 and the second side surface 412 may extend substantially in the Y-axis direction. For example, the third side surface 413 and the fourth side surface 414 may extend substantially in the X-axis direction. In the illustrated embodiment, the first side surface 411 may be disposed substantially in the X-axis direction from the second side surface 412. The fourth side surface 414 may be disposed substantially in the Y-axis direction from the third side surface 413.

In an embodiment, an opening area 4111 may be formed in the first side surface 411 of the first camera housing 410. In various embodiments, at least a portion of the first printed circuit board 421 included in the camera assembly 420 may be disposed in the opening area 4111. For example, at least a portion of the first printed circuit board 421 may be exposed outside the first camera housing 410 through the opening area 4111.

In an embodiment, a plurality of coils (e.g., a second coil 492-2, a third coil 492-3, and a fourth coil 492-4) may be disposed on at least some side surfaces (e.g., the second side surface 412, the third side surface 413, and the fourth side surface 414) among the plurality of side surfaces 411, 412, 413, and 414 of the first camera housing 410.

In an embodiment, the second coil 492-2 may be disposed on the second side surface 412. In an embodiment, the second coil 492-2 may be disposed to substantially face a second magnetic body 494-2 included in the camera assembly 420. In various embodiments, a second sensor (e.g., a second sensor 496-2 of FIG. 10A) that senses the position of the second magnetic body 494-2 may be disposed on the second side surface 412.

In an embodiment, the third coil 492-3 may be disposed on the third side surface 413. In an embodiment, the third coil 492-3 may be disposed to substantially face a third magnetic body 494-3 included in the camera assembly 420. In various embodiments, a third sensor (not illustrated) that senses the position of the third magnetic body 494-3 may be disposed on the third side surface 413.

In an embodiment, the fourth coil 492-4 may be disposed on the fourth side surface 414. In an embodiment, the fourth coil 492-4 may be disposed to substantially face a fourth magnetic body 494-4 included in the camera assembly 420. In various embodiments, a fourth sensor (e.g., a fourth sensor 496-4 of FIG. 10A) that senses the position of the fourth magnetic body 494-4 may be disposed on the fourth side surface 414.

In an embodiment, the first camera housing 410 may include a third corner portion 415 and a fourth corner portion 416 to which the second guide plate 460 is connected.

In an embodiment, the third corner portion 415 and the fourth corner portion 416 may be formed to substantially face each other in the direction of the second rotational axis R2. For example, the third corner portion 415 may be formed on the portion where the second side surface 412 and the third side surface 413 are connected. For example, the fourth corner portion 416 may be formed on the portion where the first side surface 411 and the fourth side surface 414 are connected.

In various embodiments, the second guide plate 460 may be connected, directly or indirectly, to the first camera housing 410 in the direction of the second rotational axis R2. For example, the second guide plate 460 may be connected so as to be rotatable about the second rotational axis R2. In various embodiments, the third corner portion 415 and the fourth corner portion 416 may include support structures (e.g., a first support structure 417 and a second support structure 418 of FIG. 9B) such that the second guide plate 460 is connected so as to be rotatable.

In an embodiment, the camera assembly 420 may include an assembly case 429 in which the lens 431 and at least a portion of a lens barrel 432 are accommodated, a holder 440 at least partially surrounding the assembly case 429, and the first printed circuit board 421 that is disposed on a lower surface of the assembly case 429 or forms the lower surface of the assembly case 429.

In an embodiment, the lens 431 protruding in the direction of the optical axis L and the lens barrel 432 surrounding the lens 431 may be disposed in the assembly case 429. An image sensor (e.g., an image sensor 439 of FIG. 7) disposed in the direction of the optical axis L from the lens 431 may be disposed in the assembly case 429. The image sensor 439 may be configured to convert light incident from the lens 431 into an electrical signal.

In an embodiment (e.g., refer to FIG. 8A), the image sensor 439 may be disposed on at least a partial area of the first printed circuit board 421 (e.g., a base portion 422 of FIG. 8A) that forms the lower surface of the assembly case 429.

In an embodiment, the holder 440 may include a plurality of sidewalls 441, 442, 443, and 444 to surround at least a portion of the assembly case 429. In various embodiments, the holder 440 and the assembly case 429 may form an outer surface of the camera assembly 420.

In an embodiment, the plurality of sidewalls 441, 442, 443, and 444 may include the first sidewall 441 and the second sidewall 442 facing each other and the third sidewall 443 and the fourth sidewall 444 facing each other. The first sidewall 441 and the second sidewall 442 may be connected by the third sidewall 443 and the fourth sidewall 444. Accordingly, a space surrounding side surfaces of the assembly case 429 may be formed.

For example, the first sidewall 441 and the second sidewall 442 may extend substantially in the Y-axis direction. For example, the third sidewall 443 and the fourth sidewall 444 may extend substantially in the X-axis direction. In the illustrated embodiment, the first sidewall 441 may be disposed substantially in the X-axis direction from the second sidewall 442. The fourth sidewall 444 may be disposed substantially in the Y-axis direction from the third sidewall 443.

In an embodiment, the plurality of sidewalls 441, 442, 443, and 444 of the holder 440 may substantially face the plurality of side surfaces 411, 412, 413, and 414 of the first camera housing 410, respectively. For example, the first sidewall 441 may substantially face the first side surface 411 of the first camera housing 410. The second sidewall 442 may substantially face the second side surface 412 of the first camera housing 410. The third sidewall 443 may substantially face the third side surface 413 of the first camera housing 410. The fourth sidewall 444 may substantially face the fourth side surface 414 of the first camera housing 410. In an embodiment, at least a portion of the first sidewall 441 may be visible from outside the first camera housing 410 through the opening area 4411 formed in the first side surface 411 of the first camera housing 410.

In an embodiment, the plurality of magnetic bodies 494-2, 494-3, and 494-4 and yoke members 498 may be disposed on the second sidewall 442, the third sidewall 443, and/or the fourth sidewall 444 among the plurality of sidewalls 441, 442, 443, and 444 of the holder 440. In an embodiment, the plurality of magnetic bodies 494-2, 494-3, and 494-4 may include the second magnetic body 494-2, the third magnetic body 494-3, and the fourth magnetic body 494-4.

In an embodiment, the second magnetic body 494-2 may be disposed on the second sidewall 442 to substantially face the second coil 492-2. The third magnetic body 494-3 may be disposed on the third sidewall 443 to substantially face the third coil 492-3. The fourth magnetic body 494-4 may be disposed on the fourth sidewall 444 to substantially face the fourth coil 492-4. In an embodiment, the second magnetic body 494-2, the third magnetic body 494-3, and the fourth magnetic body 494-4 may be disposed adjacent to, directly indirectly, the second sensor (e.g., the second sensor 496-2 of FIG. 10A), the third sensor (not illustrated), and the fourth sensor (e.g., the fourth sensor 496-4 of FIG. 10A) that are disposed on the first camera housing 410.

In an embodiment, the yoke members 498 may be disposed between the second sidewall 441 and the second magnetic body 494-2, between the third sidewall 443 and the third magnetic body 494-3, and/or between the fourth sidewall 444 and the fourth magnetic body 494-4. In various embodiments, the yoke members 498 may contain a magnetic material and may be disposed between the assembly case 429 and the plurality of magnetic bodies 494-2, 494-3, and 494-4 such that magnetic fields formed from the second magnetic body 494-2, the third magnetic body 494-3, and the fourth magnetic body 494-4 do not pass through the inside of the camera assembly 420.

In an embodiment, the holder 440 may be connected, directly or indirectly, with the first guide plate 450. For example, the holder 440 may include a first corner portion 445 and a second corner portion 446 to which at least portions of the first guide plate 450 are connected.

In an embodiment, the first corner portion 445 may be formed on the portion where the first sidewall 441 and the third sidewall 443 are connected. The second corner portion 446 may be formed on the portion where the second sidewall 442 and the fourth sidewall 444 are connected. For example, the first corner portion 445 and the second corner portion 446 may substantially face each other in the direction of the second rotational axis R2.

In an embodiment, a first connecting portion 451 of the first guide plate 450 may be coupled, directly or indirectly, to the first corner portion 445. In an embodiment, a second connecting portion 452 of the first guide plate 450 may be coupled to the second corner portion 446.

In various embodiments, the first corner portion 445 and the second corner portion 446 may include insertion openings 447 into which at least portions of the first connecting portion 451 and the second connecting portion 452 are inserted. For example, the insertion openings 447 may be formed such that partial areas of the first corner portion 445 and the second corner portion 446 are recessed substantially in the −Z-axis direction. In various embodiments, the insertion openings 447 may be formed in a shape corresponding to the at least portions of the first connecting portion 451 and the second connecting portion 452. Accordingly, the first guide plate 450 may be connected to rotate together with the camera assembly 420 when the camera assembly 420 rotates.

In various embodiments, stopping members (not illustrated) for preventing or reducing separation of the first guide plate 450 from the holder 440 may be formed in at least portions of the insertion openings 447. For example, stopping members corresponding to at least portions of the first connecting portion 451 and the second connecting portion 452 may be formed in the insertion openings 447. For example, the stopping members may prevent or reduce separation of the first guide plate 450 while being stopped by the at least portions of the first connecting portion 451 and the second connecting portion 452.

In an embodiment, the camera assembly 420 may include the first printed circuit board 421 that is disposed on the lower surface of the assembly case 429 or forms the lower surface of the assembly case 429.

In an embodiment, at least a portion of the first printed circuit board 421 (e.g., the base portion 422 of FIG. 8A) may be disposed on the lower surface of the assembly case 429, and another portion (e.g., extending portions 424 and 426 of FIG. 8A) may be disposed on a side surface of the assembly case 429. In an embodiment, the first wireless communication module 522 may be disposed on at least a portion of the first printed circuit board 421 disposed in a lateral direction of the assembly case 429. In various embodiments, the first wireless communication module 522 may be disposed substantially parallel to the first sidewall 441 of the camera assembly 420. In various embodiments, the first printed circuit board 421 may rotate together with the camera assembly 420 when the camera assembly 420 rotates.

In an embodiment, the guide plate 450, 460, and 470 may include the second guide plate 460 connected, directly or indirectly, to the first camera housing 410 so as to be rotatable about the second rotational axis R2, the third guide plate 470 connected to the second guide plate 460 so as to be rotatable about the first rotational axis R1, and the first guide plate 450 connected to the third guide plate 470 so as to be rotatable about the third rotational axis R3 and connected to the camera assembly 420 to rotate together with the camera assembly 420.

In an embodiment, the first guide plate 450 may include the first connecting portion 451 and the second connecting portion 452 that are connected to the camera assembly 420 in the direction of the second rotational axis R2. For example, the first connecting portion 451 may be connected to the first corner portion 445 of the holder 440, and the second connecting portion 452 may be connected to the second corner portion 446 of the holder 440. In various embodiments, at least portions of the first connecting portion 451 and the second connecting portion 452 may be inserted into the insertion openings 447 formed in the first corner portion 445 and the second corner portion 446.

In various embodiments, the first guide plate 450 may rotate together with the camera assembly 420 when the camera assembly 420 rotates about at least one of the first rotational axis R1, the second rotational axis R2, or the third rotational axis R3.

In an embodiment, the second guide plate 460 may include a second central portion 461, a third connecting portion 462 and a fourth connecting portion 463 that extend in the direction of the first rotational axis R1 from the second central portion 461, and a fifth connecting portion 464 and a sixth connecting portion 465 that extend in the direction of the second rotational axis R2 from the second central portion 461.

In an embodiment, the third connecting portion 462 and the fourth connecting portion 463 may be connected to the third guide plate 470. The fifth connecting portion 464 and the sixth connecting portion 465 may be connected to the first camera housing 410. For example, the third connecting portion 462 and the fourth connecting portion 463 may be connected so as to be rotatable about the first rotational axis R1 relative to the third guide plate 470. For example, the fifth connecting portion 464 and the sixth connecting portion 465 may be connected so as to be rotatable about the second rotational axis R2 relative to the first camera housing 410.

In various embodiments, the second guide plate 460 may be fixed and/or constrained so as not to rotate together with the camera assembly 420 when the camera assembly 420 rotates about the first rotational axis R1 or the third rotational axis R3. In various embodiments, the second guide plate 460 may rotate together with the camera assembly 420 when the camera assembly 420 rotates about the second rotational axis R2.

In an embodiment, the third guide plate 470 may be connected to the first guide plate 450 and the second guide plate 460.

In an embodiment, the third guide plate 470 may be coupled, directly or indirectly, to the first guide plate 450 to rotate together with the first guide plate 450 when the camera assembly 420 rotates about the first rotational axis R1 and the second rotational axis R2. In an embodiment, the third guide plate 470 may be coupled, directly or indirectly, to the second guide plate 460 to rotate about the first rotational axis R1 relative to the second guide plate 460. In an embodiment, the third guide plate 470 may be coupled to the first guide plate 450 and the second guide plate 460 to rotate about the third rotational axis R3 relative to the first guide plate 450.

In various embodiments, the third guide plate 470 may rotate together with the camera assembly 420 and the first guide plate 450 when the camera assembly 420 rotates about the first rotational axis R1. In various embodiments, the third guide plate 470 may rotate together with the camera assembly 420, the first guide plate 450, and the second guide plate 460 when the camera assembly 420 rotates about the second rotational axis R2. In various embodiments, the third guide plate 470 may be fixed and/or constrained so as not to rotate together with the camera assembly 420 and the first guide plate 450 when the camera assembly 420 rotates about the third rotational axis R3.

Figure 7:
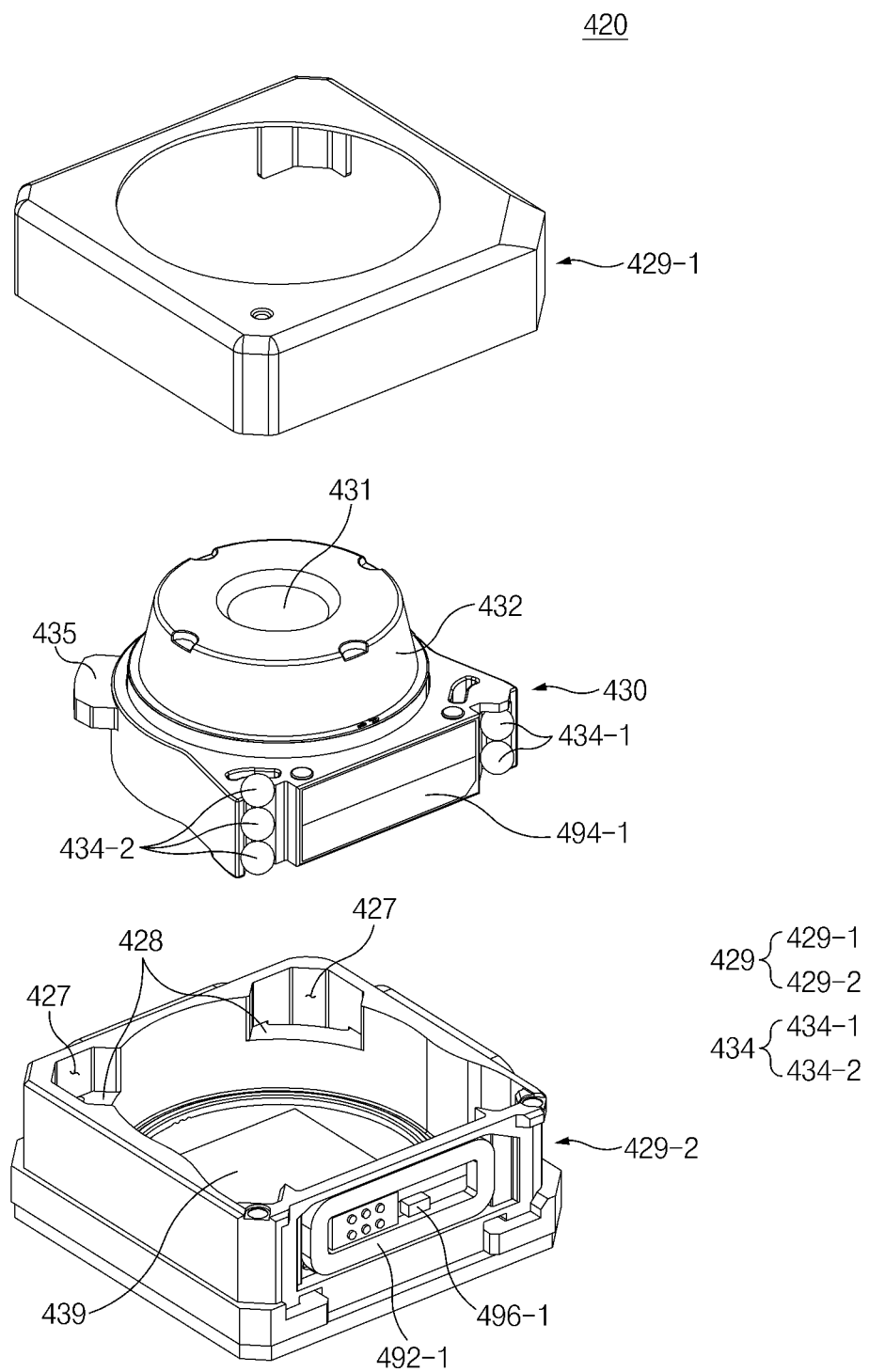
FIG. 7 is an exploded perspective view of the camera assembly of the camera module according to an example embodiment.

FIG. 7 is an exploded perspective view of the camera assembly of the camera module according to an embodiment.

Referring to FIG. 7, the camera assembly 420 may include the assembly case 429 and a lens carrier 430.

In an embodiment, the assembly case 429 may form an inner space in which the lens carrier 430 is accommodated. For example, the assembly case 429 may include an upper case 429-1 and a lower case 429-2. In an embodiment, the upper case 429-1 may have an opening formed in an upper surface thereof. In an embodiment, the image sensor 439 may be disposed in the lower case 429-2. In various embodiments, the opening may be aligned with an opening area (e.g., opening areas 4551, 4581, 4611, and 4731 of FIG. 8) of the guide plate (e.g., the guide plate 450, 460, and 470 of FIG. 8). In various embodiments, the opening may be aligned with the lens 431. In various embodiments, the lens barrel 432 may protrude outside the assembly case 429 through the opening.

In an embodiment, the lens carrier 430 may include the lens barrel 432. The lens barrel 432 may include at least one lens 431 therein. The lens barrel 432 may be formed to surround the lens 431. In an embodiment, the lens carrier 430 may be moved (e.g., L/–L directions) with respect to the optical axis L of the lens 431 in the space between the upper case 429-1 and the lower case 429-2. The camera module 400 may provide an auto focus function as the lens 431, together with the lens carrier 430, is moved (e.g., the L/–L directions) with respect to the direction of the optical axis L. For example, the camera module 400 may provide an auto focus function by moving (e.g., the L/–L directions) the lens 431 in a direction substantially parallel to the optical axis L of the lens 431.

In an embodiment, the camera assembly 420 may include a first magnetic body 494-1 and a first coil 492-1 for moving (e.g., the L/–L directions) the lens carrier 430 with respect to the optical axis L of the lens 431. For example, the first magnetic body 494-1 may be disposed on a side surface of the lens carrier 430, and the first coil 492-1 may be disposed on the upper case 429-1 or the lower case 429-2 to substantially face the first magnetic body 494-1. The first magnetic body 494-1 and the first coil 492-1 may electromagnetically interact with each other. However, the positions of the first coil 492-1 and the first magnetic body 494-1 are not necessarily limited to the embodiment illustrated in FIG. 7. In various embodiments, the first coil 492-1 may be disposed on the side surface of the lens carrier 430, and the first magnetic body 494-1 may be disposed on the upper case 429-1 or the lower case 429-2 to face the first coil 492-1.

In an embodiment, the camera assembly 420 may further include a first sensor 496-1 configured to sense the position of the first magnetic body 494-1. For example, the first sensor 95-1 may be disposed on the upper case 429-1 or the lower case 429-2. The first sensor 95-1 may detect the displacement of the lens carrier 430 through the position of the first magnetic body 494-1 moving together with the lens carrier 430. For example, the first sensor 95-1 may include a Hall sensor that senses the magnetic force of the first magnetic body 494-1. The camera module 400 may measure the position of the lens carrier 430, based on a signal sensed by the first sensor 95-1.

In an embodiment, the first sensor 95-1 may detect the displacement of the lens carrier 430 and/or the first magnetic body 494-1, and the electronic device (e.g., the processor 120 of FIG. 1 or the image signal processor 260 of FIG. 2) may provide an auto focus function using the first magnetic body 494-1 and the first coil 492-1. For example, the distance between the lens 431 and the image sensor 439 disposed in the assembly case 429 (e.g., the lower case 429-2) may be varied as the lens 461, together with the lens carrier 430, is moved (e.g., the L/–L directions) with respect to the direction of the optical axis L. As described above, the electronic device may adjust a focal length by moving the lens carrier 430 depending on the distance from an object.

In an embodiment, the camera assembly 420 may include a plurality of balls 434 disposed between the side surface of the lens carrier 430 and the assembly case 429. In an embodiment, the plurality of balls 434 may provide a rolling frictional force between the lens carrier 430 and the second camera housing 480 when the lens carrier 430 is moved in the direction of the optical axis L. In the illustrated embodiment, the plurality of balls 434 may include a first plurality of balls 434-1 disposed on a side of the first magnetic body 494-1 and a second plurality of balls 434-2 disposed on an opposite side of the first magnetic body 494-1. For example, the first plurality of balls 434-1 and the second plurality of balls 434-2 may be arranged in the direction of the optical axis L of the lens 431.

In an embodiment, to guide a movement of the lens carrier 430 in the direction of the optical axis L, the camera assembly 420 may include a guide member 435 and a guide rail 427 in which the guide member 435 is accommodated. The guide member 435 may protrude from a side surface of the lens carrier 430, and the guide rail 427 may be formed on the upper case 429-1 or the lower case 429-2 and may have the guide member 435 accommodated therein. For example, the guide rail 427 may be formed on the lower case 429-2. The guide member 435 may be accommodated in the guide rail 427 and may guide a movement (e.g., the L/–L directions) of the lens carrier 430 with respect to the optical axis L.

In an embodiment, the guide rail 427 may extend from a step surface 428 formed on the lower case 429-2 and may be open in an upper direction. When the lens carrier 430 moves in a lower direction, the step surface 428 may support the guide member 435 to limit a movement range of the lens carrier 430 in the lower direction (e.g., the –L direction).

Figure 8A:
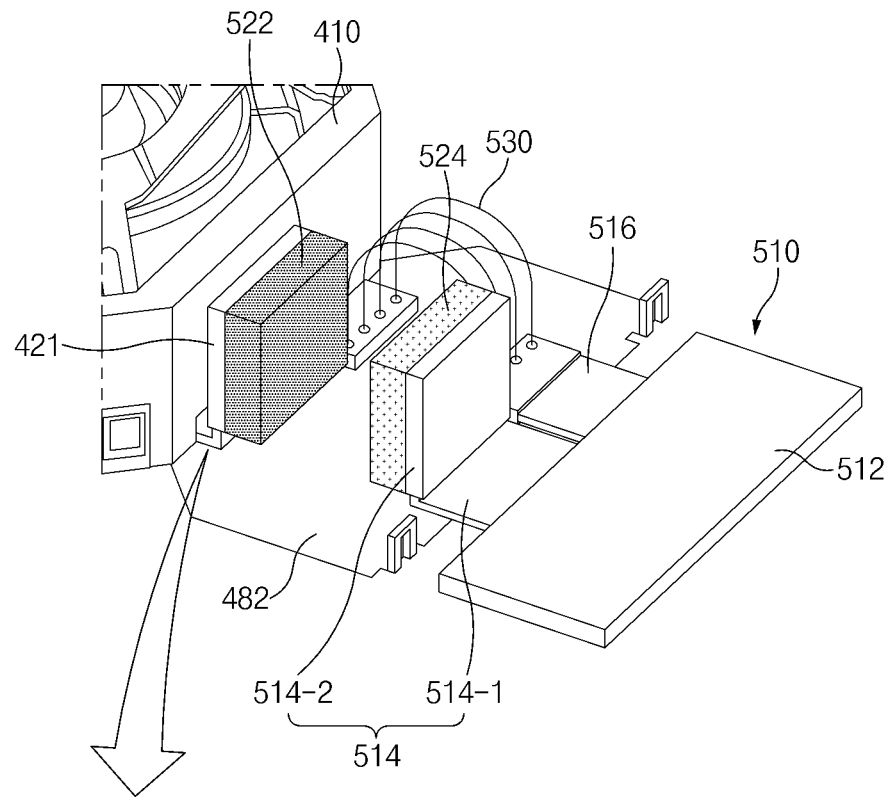
FIG. 8A is a view illustrating a first printed circuit board, a second printed circuit board, and a wireless communication module of the camera module according to an example embodiment.

FIG. 8A is a perspective view illustrating a state in which the first wireless communication module and the second wireless communication module are disposed on the first printed circuit board and the second printed circuit board. FIG. 8B is a plan view illustrating the state in which the first wireless communication module and the second wireless communication module are disposed on the first printed circuit board and the second printed circuit board.

FIGS. 8A and 8B may be views in which the cover of the second camera housing is omitted from the camera module illustrated in FIGS. 4 and 5.

Referring to FIGS. 8A and 8B, the camera module 400 may include the first printed circuit board 421, at least a portion of which is disposed in the first camera housing 410, the second printed circuit board 510, at least a portion of which is disposed on the second area 482 of the base plate (e.g., the base plate 480-1 of FIG. 5), the first wireless communication module 522 disposed on the first printed circuit board 421, the second wireless communication module 524 disposed on the second printed circuit board 510, and a cable 530 connecting, directly or indirectly, the first printed circuit board 421 and the second printed circuit board 510.

In an embodiment, the first printed circuit board 421 may include the base portion 422, the first extending portion 424, and the second extending portion 426.

In an embodiment, the image sensor 439 may be disposed on the base portion 422 of the first printed circuit board 421. For example, the image sensor 439 may be disposed on a partial area of a base portion 512 to face a direction (e.g., the Z-axis direction) substantially parallel to the optical axis L of the lens (e.g., the lens 431 of FIG. 6).

Figure 11A:
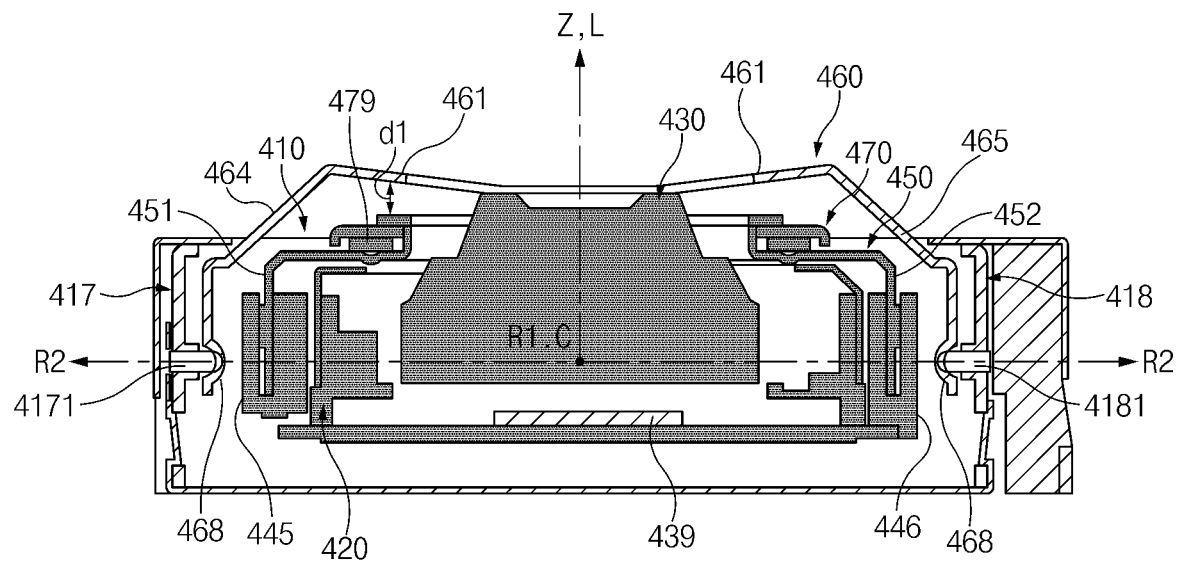
FIGS. 11A and 11B are views illustrating a first rotational operation of the camera module according to an example embodiment.
Figure 11B:
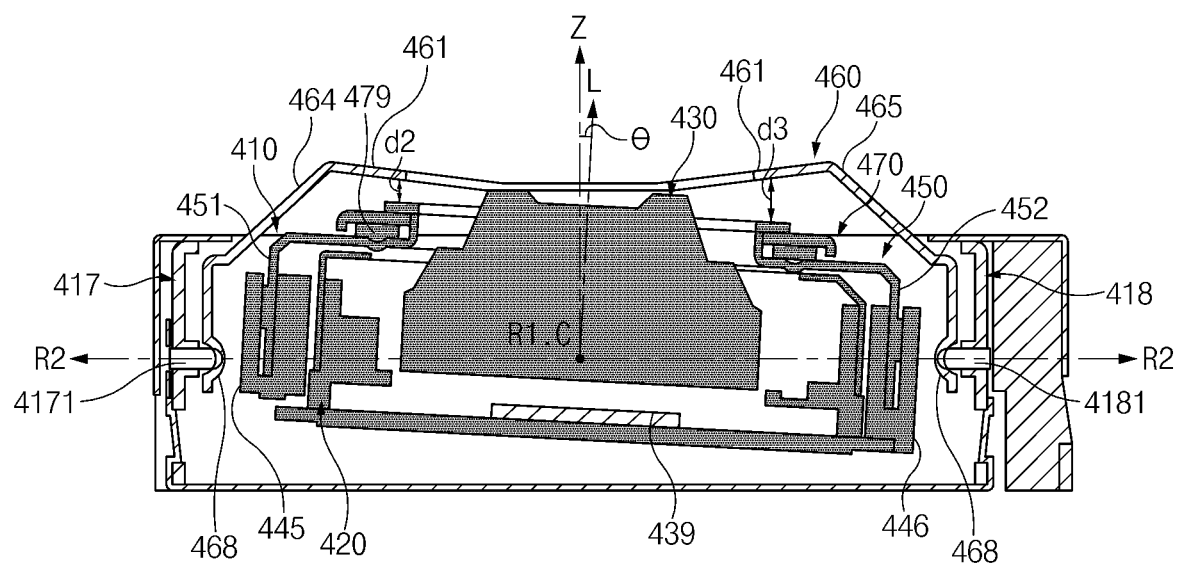
Figure 12A:
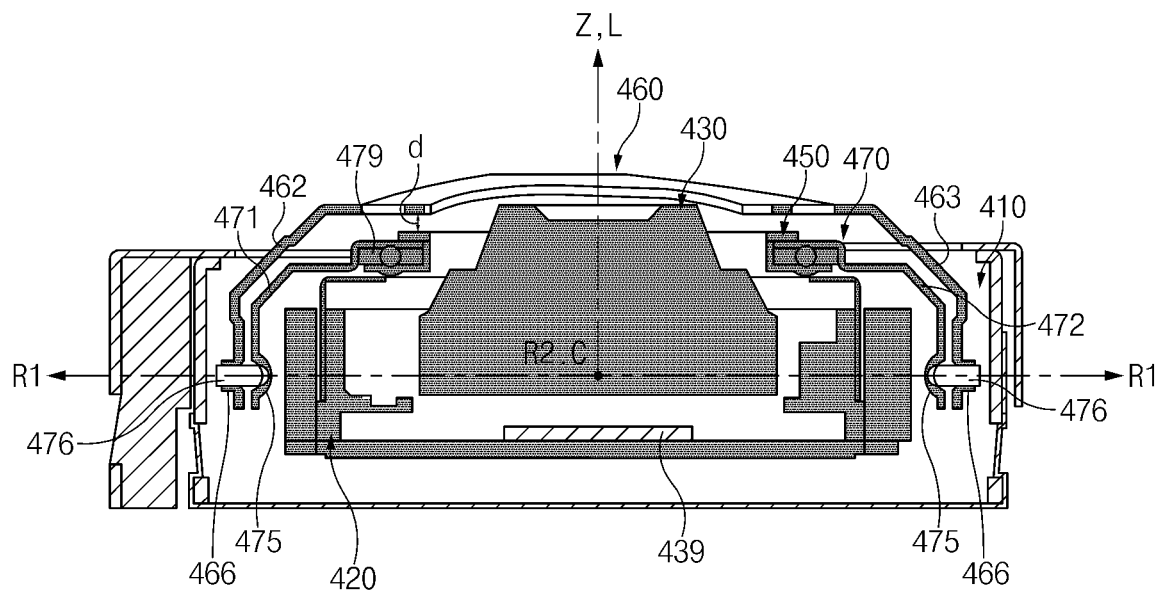
FIGS. 12A and 12B are views illustrating a second rotational operation of the camera module according to an example embodiment.
Figure 12B:
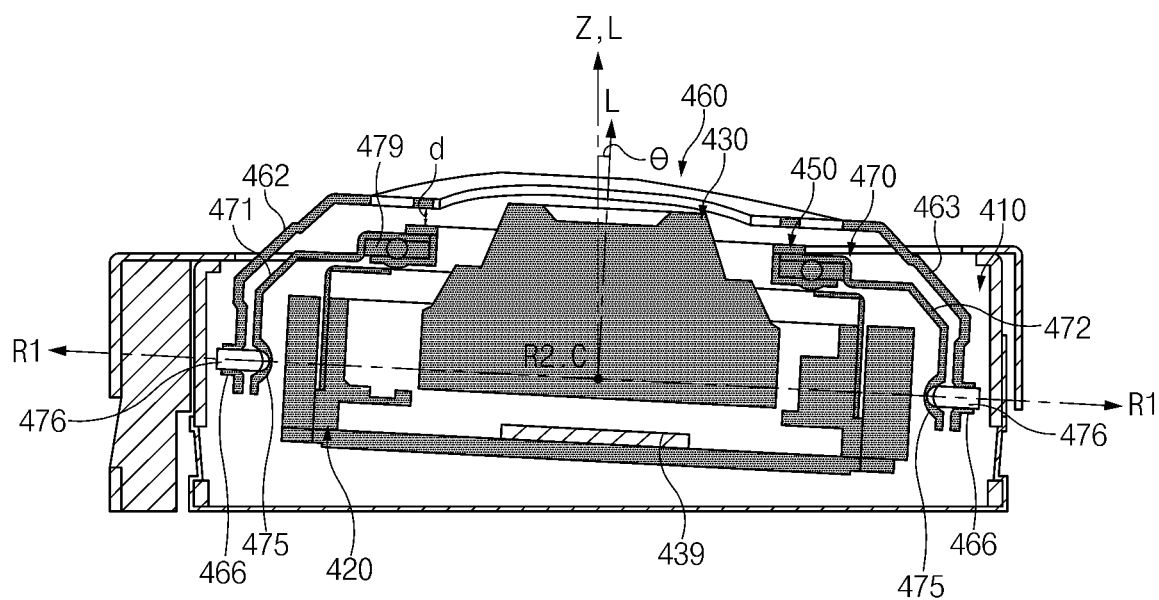

In various embodiments, the camera assembly (e.g., the camera assembly 420 of FIG. 5) may perform a first rotational operation (e.g., FIG. 11) and a second rotational operation (e.g., FIG. 12). When the camera assembly 420 performs the first rotational operation and/or the second rotational operation, the optical axis L and the Z-axis may form a predetermined angle (e.g., a predetermined angle θ of FIGS. 11 and 12). In this case, the first printed circuit board 421 may rotate together with the camera assembly 420, and the image sensor 439 may face a direction parallel to the optical axis L.

In an embodiment, the extending portions (e.g., the first extending portion 424 and the second extending portion 426) of the first printed circuit board 421 may extend from the base portion 422. For example, the first extending portion 424 and the second extending portion 426 may extend substantially in the X-axis direction from the base portion 422. In various embodiments, the first extending portion 424 and the second extending portion 426 may be formed to branch from the base portion 422.

In an embodiment, at least a portion of the first extending portion 424 may be formed to face a direction substantially perpendicular to the base portion 422. In an embodiment, the first extending portion 424 may include a first portion 424-1 extending substantially parallel to the base portion 422 and a second portion 424-2 extending in a direction substantially perpendicular to the first portion 424-1. For example, the first portion 424-1 may extend substantially in the X-axis direction from the base portion 422, and the second portion 424-2 may extend substantially in the Z-axis direction from the first portion 424-1.

In an embodiment, the second extending portion 426 may extend substantially parallel to the base portion 422. For example, the second extending portion 426 may extend substantially in the X-axis direction from the base portion 422 so as to be spaced apart from the first extending portion 424.

In various embodiments, the base portion 422 of the first printed circuit board 421 may be disposed inside the first camera housing 410, and the first extending portion 424 and the second extending portion 426 of the first printed circuit board 421 may be disposed outside the first camera housing 410. In various embodiments, the base portion 422 of the first printed circuit board 421 may be disposed on a lower surface of the camera assembly (e.g., the camera assembly 420 of FIGS. 5 and 6), or may form the lower surface of the camera assembly 420 (e.g., refer to FIG. 6).

In an embodiment, the second printed circuit board 510 may include the base portion 512, a first extending portion 514, and a second extending portion 516.

In an embodiment, the base portion 512 of the second printed circuit board 510 may be connected with the third printed circuit board (e.g., the printed circuit board 350 of FIG. 3) disposed in the housing (e.g., the housing 210 of FIG. 3) of the electronic device (e.g., the electronic device 300 of FIG. 3). For example, at least a portion of the base portion 512 may be formed of a connector so as to be electrically connected, directly or indirectly, with the third printed circuit board located outside the camera module (e.g., the camera module 400 of FIGS. 4 to 6).

In an embodiment, the extending portions (e.g., the first extending portion 514 and the second extending portion 516) of the second printed circuit board 510 may extend from the base portion 512. For example, the first extending portion 514 and the second extending portion 516 may extend substantially in the X-axis direction from the base portion 512. In an embodiment, the first extending portion 514 and the second extending portion 516 may be formed to branch from the base portion 512.

In an embodiment, at least a portion of the first extending portion 514 may be formed to face a direction substantially perpendicular to the base portion 512. In an embodiment, the first extending portion 514 may include a first portion 514-1 extending substantially parallel to the base portion 512 and a second portion 514-2 extending in a direction substantially perpendicular to the first portion 514-1. For example, the first portion 514-1 may extend substantially in the –X-axis direction from the base portion 512, and the second portion 514-2 may extend substantially in the Z-axis direction from the first portion 514-1.

In an embodiment, the second extending portion 516 may extend substantially parallel to the base portion 512. For example, the second extending portion 516 may extend substantially in the –X-axis direction from the base portion 512 so as to be spaced apart from the first extending portion 514.

In various embodiments, at least portions of the first extending portion 514 and the second extending portion 516 of the second printed circuit board 510 may be disposed on the second area 482 of the base plate (e.g., the base plate 480-1 of FIG. 5) included in the second camera housing (e.g., the second camera housing 480 of FIG. 5), and the base portion 512 of the second printed circuit board 510 may be disposed outside the second area 482. For example, the base portion 512 of the second printed circuit board 510 may be disposed outside the second camera housing 480 (e.g., refer to FIG. 4).

In an embodiment, the first printed circuit board 421 and the second printed circuit board 510 may be disposed to at least partially face each other. For example, the first extending portion 424 of the first printed circuit board 421 and the first extending portion 514 of the second printed circuit board 510 may be disposed to substantially face each other in the X-axis direction. For example, when the first camera housing 410 is viewed from the front (e.g., the –X-axis direction), the first extending portion 424 of the first printed circuit board 421 and the first extending portion 514 of the second printed circuit board 510 may at least partially overlap each other.

In an embodiment, the first wireless communication module 522 may be disposed on the first extending portion 424 of the first printed circuit board 421. For example, the first wireless communication module 522 may be disposed on the second portion 424-2 of the first extending portion 424 so as to be substantially perpendicular to the base portion 422 of the first printed circuit board 421. For example, the first wireless communication module 522 may be disposed substantially parallel to the optical axis L.

In an embodiment, the second wireless communication module 524 may be disposed on the first extending portion 514 of the second printed circuit board 510. For example, the second wireless communication module 524 may be disposed on the second portion 514-2 of the first extending portion 514 so as to be substantially perpendicular to the base portion 512 of the second printed circuit board 510. For example, the second wireless communication module 524 may be disposed substantially parallel to the optical axis L.

In various embodiments, the first wireless communication module 522 and the second wireless communication module 524 may transmit and/or receive a signal using various methods. For example, the wireless communication modules (e.g., the first wireless communication module 522 and the second wireless communication module 524) may transmit/receive a signal through radio frequency (RF). In another example, the wireless communication modules 522 and 524 may transmit/receive a signal using a proximity wireless method. According to the proximity wireless method, the first wireless communication module 522 and the second wireless communication module 524 may transmit/receive a signal by magnetic induction or electrostatic induction. In another example, the wireless communication modules 522 and 524 may transmit/receive a signal using coils. When transmitting/receiving the signal using the coils, the first wireless communication module 522 and the second wireless communication module 524 may include the coils in substantially the same positions to transfer the signal.

In various embodiments, the first wireless communication module 522 and the second wireless communication module 524 may include a near field communication (NFC) chip for short-range wireless communication.

In various embodiments, the first wireless communication module 522 may be configured as a transmission device (e.g., TX, Transmitter) for transmitting a signal, and the second wireless communication module 524 may be configured as a reception device (e.g., Rx, Receiver) for receiving the signal. However, without being necessarily limited thereto, the first wireless communication module 522 and the second wireless communication module 524 may be configured to mutually transmit and/or receive a signal.

In an embodiment, so as not to overlap the plurality of coils 492-2, 492-3, and 492-4 and/or the plurality of magnetic bodies 494-2, 494-3, and 494-4, the wireless communication modules (e.g., the first wireless communication module 522 and the second wireless communication module 524) may be disposed in a direction different from the directions in which the plurality of coils 492-2, 492-3, and 492-4 and/or the plurality of magnetic bodies 494-2, 494-3, and 494-4 are disposed.

For example, the second coil 492-2, the third coil 492-3, and the fourth coil 492-4 may be disposed on the second sidewall 442, the third sidewall 443, and the fourth sidewall 444 of the holder 440, respectively. The second magnetic body 494-2, the third magnetic body 494-3, and the fourth magnetic body 494-4 may be disposed on the first camera housing 410 to face the second coil 492-2, the third coil 492-3, and the fourth coil 492-4, respectively. In this case, the first wireless communication module 522 may be disposed in the direction of the first sidewall 441 so as not to be located on the same plane as the plurality of coils 492-2, 492-3, and 492-4 and the plurality of magnetic bodies 494-2, 494-3, and 494-4. Accordingly, signal interference due to electromagnetic interaction of the plurality of coils 492-2, 492-3, and 492-4 and the plurality of magnetic bodies 494-2, 494-3, and 494-4 may be prevented, reduced, and/or removed when the wireless communication modules 522 and 524 transmit and/or receive a signal.

In an embodiment, the distance d1 between the first wireless communication module 522 and the third sidewall 443 may substantially differ from the distance d2 between the first wireless communication module 522 and the fourth sidewall 444.

In various embodiments, the first wireless communication module 522 may be disposed closer to the third sidewall 443 than the fourth sidewall 444. For example, when the first camera housing 410 is viewed from above, the distance d1 by which the first wireless communication module 522 and the third sidewall 443 are spaced apart from each other in the Y-axis direction may be smaller than the distance d2 by which the first wireless communication module 522 and the fourth sidewall 444 are spaced apart from each other in the Y-axis direction (e.g., refer to FIG. 8B). In various embodiments, by adjusting the position of the first wireless communication module 522, the center of gravity of the rotating camera assembly 420 may be disposed adjacent to the center of rotation C. Accordingly, a design for minimizing or reducing the moment of inertia is possible, and a rotational operation of the camera assembly 420 may be smoothly performed.

In various embodiments, the position of the first wireless communication module 522 is not limited to the embodiment illustrated in FIG. 8B, and, for example, the first wireless communication module 522 may be disposed closer to the fourth sidewall 444 than the third sidewall 443.

In an embodiment, the plurality of coils 492-2, 492-3, and 492-4 may be disposed on the first camera housing 410, and the plurality of magnetic bodies 494-2, 494-3, and 494-4 may be disposed on the camera assembly 420 to face the plurality of coils 492-2, 492-3, and 492-4. For example, in the embodiment, a signal related to the camera module 400 that is transferred through the wireless communication modules 522 and 524 may include an image-related signal generated from the image sensor 439 and a first control signal for controlling the first coil (e.g., the first coil 492-1 of FIG. 7) in relation to an auto focus function.

In various embodiments, the first wireless communication module 522 may be disposed in substantially the same direction as the first coil (e.g., the first coil 492-1 of FIG. 7). In various embodiments, the first wireless communication module 522 and the first coil 492-1 may be disposed to face substantially the same direction as the first sidewall 441. For example, the first coil 492-1 may be disposed inside the assembly case (e.g., the assembly case 429 of FIGS. 6 and 7) so as to be substantially parallel to the first sidewall 441. The first wireless communication module 522 may be disposed outside the first camera housing 410 so as to be substantially parallel to the first sidewall 441.

FIGS. 8A and 8B illustrate an embodiment regarding the camera module 400 (e.g., 3-axis Module Tilt OIS) configured such that the camera assembly 420 is rotatable about three rotational axes (e.g., the first rotational axis R1, the second rotational axis R2, and the third rotational axis R3), and the camera module 400 may include three rotary drive sources (e.g., the second coil 492-2, the third coil 492-3, the fourth coil 492-4, the second magnetic body 494-2, the third magnetic body 494-3, and the fourth magnetic body 494-4). However, the scope is not necessarily limited thereto, and according to various embodiments, the camera module 400 may be configured to be rotatable about two rotational axes (e.g., the first rotational axis R1 and the second rotation axis R2) perpendicular to the optical axis L of the lens 431 (e.g., 2-axis Module Tilt OIS).

In another embodiment, the camera module 400 configured to be rotatable about two rotational axes may include the first coil (e.g., the first coil 492-1 of FIG. 7) and the first magnetic body (e.g., the first magnetic body 494-1 of FIG. 7) for an auto focus function and may include two coils (e.g., the second coil 492-2 and the third coil 492-3) and two magnetic bodies (e.g., the second magnetic body 494-2 and the third magnetic body 494-3) that interact with each other to rotate the camera assembly 420 about the first rotational axis R1 and/or the second rotational axis R2. For example, according to the other embodiment, the camera module 400 may not include the fourth coil 492-4 and the fourth magnetic body 494-4 in the embodiment illustrated in FIG. 8. However, the scope is not necessarily limited thereto, and according to various embodiments, the camera module 400 may be configured to include the second coil 492-2 and the fourth coil 492-4 and include the second magnetic body 494-2 and the fourth magnetic body 494-4.

In the other embodiment, the first wireless communication module 522 may be disposed so as not to overlap the second coil 492-2 and/or the second magnetic body 494-2. Furthermore, the first wireless communication module 522 may be disposed so as not to overlap the third coil 492-3 and/or the third magnetic body 494-3. For example, the second coil 492-2 and the second magnetic body 494-2 may be disposed in the same direction as the second sidewall 442. The third coil 492-3 and the third magnetic body 494-3 may be disposed in the same direction as the third sidewall 443. For example, a drive source (e.g., a coil and a magnetic body) for rotation of the camera assembly 420 may not be disposed on the fourth sidewall 444. In this case, the first wireless communication module 522 may be disposed in the direction of the first sidewall 441, or may be disposed in the direction of the fourth sidewall 444, so as not to be disposed in the same direction as the rotary drive source. However, a sidewall having no rotary drive source disposed thereon is not necessarily limited to the fourth sidewall 444. In some embodiments, a rotary drive source may not be disposed on the third sidewall 443. In this case, the first wireless communication module 522 may be disposed in the direction of the first sidewall 441 or the third sidewall 443.

In the other embodiment, when the first wireless communication module 522 is disposed in the direction of the first sidewall 441, the first wireless communication module 522 may be disposed in substantially the same direction as the first coil (e.g., the first coil 492-1 of FIG. 7) and the first magnetic body (e.g., the first magnetic body 494-1 of FIG.

7). Furthermore, when the first wireless communication module 522 is disposed in the direction of the fourth sidewall 444, the first wireless communication module 522 may not overlap all the coils (e.g., the first coil 492-1, the second coil 492-2, and the third coil 492-3) and all the magnetic bodies (the first magnetic body 494-1, the second magnetic body 494-2, and the third magnetic body 494-3) included in the camera module 400.

Unlike in the embodiment illustrated in FIG. 8B, the positions of the plurality of coils 492-2, 492-3, and 492-4 and the positions of the plurality of magnetic bodies 494-2, 494-3, and 494-4 may be interchanged. In another embodiment, the plurality of coils 492-2, 492-3, and 492-4 may be disposed on the camera assembly 420, and the plurality of magnetic bodies 494-2, 494-3, and 494-4 may be disposed on the first camera housing 410 to face the plurality of coils 492-2, 492-3, and 492-4. For example, the second coil 492-2, the third coil 492-3, and the fourth coil 492-4 may be disposed on the holder 440. The second magnetic body 494-2, the third magnetic body 494-3, and the fourth magnetic body 494-4 may be disposed on the first camera housing 410.

For example, in the other embodiment, the signal related to the camera module 400 may further include a signal for controlling the plurality of coils 492-2, 492-3, and 492-4 in relation to an image stabilization function, in addition to the image-related signal and the first control signal for controlling the first coil (e.g., the first coil 492-1 of FIG. 7). For example, the wireless communication modules 522 and 524 may transfer a second control signal for controlling the second coil 492-2, the third coil 492-3, and/or the fourth coil 492-4.

In an embodiment, the cable 530 may be disposed between the first printed circuit board 421 and the second printed circuit board 510. For example, one end portion of the cable 530 may be connected, directly or indirectly, to the second extending portion 426 of the first printed circuit board 421, and an opposite end portion of the cable 530 may be connected, directly or indirectly, to the second extending portion 516 of the second printed circuit board 510.

In various embodiments, the cable 530 may supply power to the camera module 400. For example, the second printed circuit board 510 may be connected to the third printed circuit board (e.g., the printed circuit board 350 of FIG. 3), and the cable 530 may electrically connect the first printed circuit board 421 and the second printed circuit board 510. For example, a power signal may be transferred from the second printed circuit board 510 to the camera module 400 through the cable 530. In various embodiments, the cable 530 may include a wire structure and/or a flexible printed circuit board (FPCB) to enable electrical connection. In various embodiments, one or more cables 530 may be formed according to the specification of the camera module 400.

The camera module 400 according to the example embodiment may include the first wireless communication module 522 and the second wireless communication module 524 for wirelessly transmitting and/or receiving a signal related to a function and/or operation of the camera module 400 (e.g., an image signal and/or a signal related to an auto focus function).

In the case in which the rotating camera assembly 420 is connected with the third printed circuit board (e.g., the printed circuit board 350 of FIG. 3) disposed in the electronic device (e.g., the electronic device 300 of FIG. 3) through a flexible printed circuit board (FPCB), when the camera assembly 420 rotates, the tension of the flexible printed circuit board may act to affect the rotation.

Accordingly, the camera module 400 according to the example embodiment may apply a wireless communication scheme to transfer a signal related to the camera module 400, and thus rotation of the camera module 400 may be implemented with a simple structure.

Figure 9:
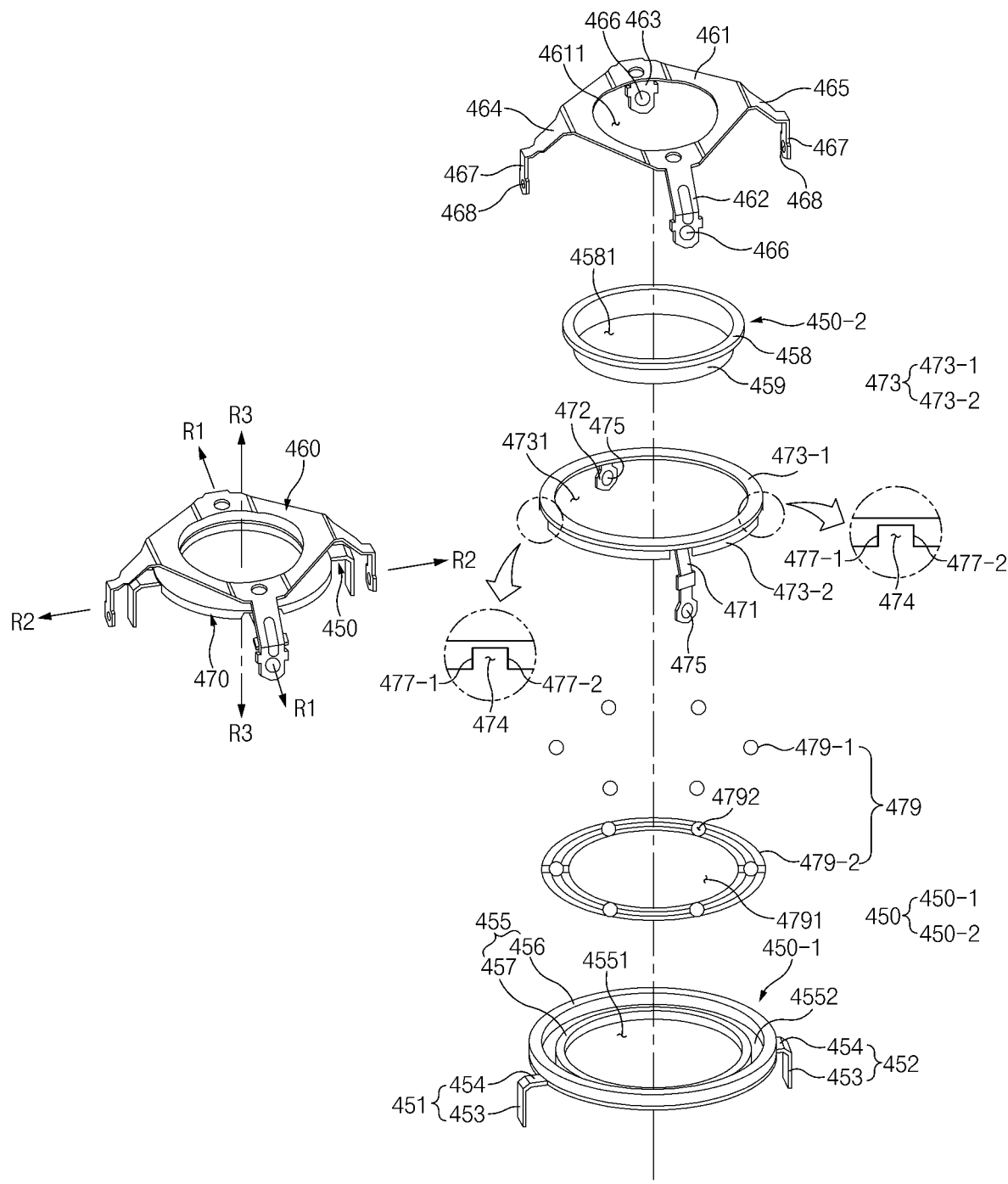
FIG. 9 is a view illustrating the guide plate of the camera module according to an example embodiment.

FIG. 9 is a view illustrating the guide plate of the camera module according to an embodiment.

Referring to FIG. 9, the guide plate 450, 460, and 470 may include the first guide plate 450, the second guide plate 460, and the third guide plate 470 connected to the first guide plate 450 and the second guide plate 460.

In an embodiment, the first guide plate 450 may include a lower fixed plate 450-1 and an upper fixed plate 450-2. In various embodiments, a bearing structure 479 and the third guide plate 470 may be disposed over the lower fixed plate 450-1. In an embodiment, the upper fixed plate 450-2 may be coupled, directly or indirectly, to the lower fixed plate 450-1.

In an embodiment, the lower fixed plate 450-1 may include a first central portion 455 having the opening area 4551 formed therein, and the first connecting portion 451 and the second connecting portion 452 that extend from the first central portion 455. In an embodiment, the first connecting portion 451 and the second connecting portion 452 may be coupled, directly or indirectly, to the camera assembly (e.g., the holder 440 of FIG. 5) in the direction of the second rotational axis R2.

In an embodiment, the first central portion 455 of the lower fixed plate 450-1 may include a first peripheral portion 456 and a second peripheral portion 457 spaced apart inward from the first peripheral portion 456. For example, the inward direction may be a direction substantially toward the third rotational axis R3. In various embodiments, a recessed portion 4552 in which the bearing structure 479 is disposed may be formed between the first peripheral portion 456 and the second peripheral portion 457.

In an embodiment, the first connecting portion 451 and the second connecting portion 452 may include a stopping portion 454 extending substantially in the direction of the second rotational axis R2 from an outer surface of the first peripheral portion 456 and an insertion portion 453 extending from the stopping portion 454. For example, an inner surface of the first peripheral portion 456 may be a surface that faces the second peripheral portion 457, and the outer surface may be a surface that faces away from the inner surface. For example, the insertion portion 453 may extend substantially in the −Z-axis direction from an end portion of the stopping portion 454. In various embodiments, at least a portion of the stopping portion 454 may be disposed in a cut-away portion 474 of the third guide plate 470, and the insertion portion 453 may be disposed in the insertion opening (e.g., the insertion opening 447 of FIG. 6) of the holder (e.g., the holder 440 of FIG. 6).

In an embodiment, the upper fixed plate 450-2 may include an upper wall portion 458 having the opening area 4581 formed therein and a sidewall portion 459 extending substantially in the −Z-axis direction from the upper wall portion 458. In various embodiments, the third guide plate 470 may be disposed between the upper fixed plate 450-2 and the lower fixed plate 450-1, and the upper fixed plate 450-2 may be fixed to the lower fixed plate 450-1. Accordingly, the third guide plate 470 may be coupled to the first guide plate 450. In various embodiments, the upper fixed plate 450-2 may be fixed to the lower fixed plate 450-1 through various coupling methods including welding, bonding, and the like.

In an embodiment, the second guide plate 460 may include the second central portion 461 having the opening area 4611 formed therein, the third connecting portion 462 and the fourth connecting portion 463 that extend in the direction of the first rotational axis R1 from the second central portion 461, and the fifth connecting portion 464 and the sixth connecting portion 465 that extend in the direction of the second rotational axis R2 from the second central portion 461. In an embodiment, the third connecting portion 462 and the fourth connecting portion 463 may be substantially perpendicular to the fifth connecting portion 464 and the sixth connecting portion 465.

In an embodiment, the third connecting portion 462 and the fourth connecting portion 463 may include a flat surface substantially facing toward the first rotational axis R1. In an embodiment, each of the third connecting portion 462 and the fourth connecting portion 463 may include a rotation-pin receiving hole 466. For example, the rotation-pin receiving holes 466 into which rotation pins (e.g., rotation pins 476 of FIG. 10) are inserted may be formed in partial areas of the flat surfaces of the third connecting portion 462 and the fourth connecting portion 463 such that a seventh connecting portion 471 and an eighth connecting portion 472 of the third guide plate 470 are coupled so as to be rotatable. For example, the rotation-pin receiving holes 466 may be formed in a shape corresponding to the rotation pins 476.

In an embodiment, the fifth connecting portion 464 and the sixth connecting portion 465 may include a support portion 467. In an embodiment, the support portion 467 may be formed to be a flat surface substantially facing toward the second rotational axis R2.

Figure 10A:
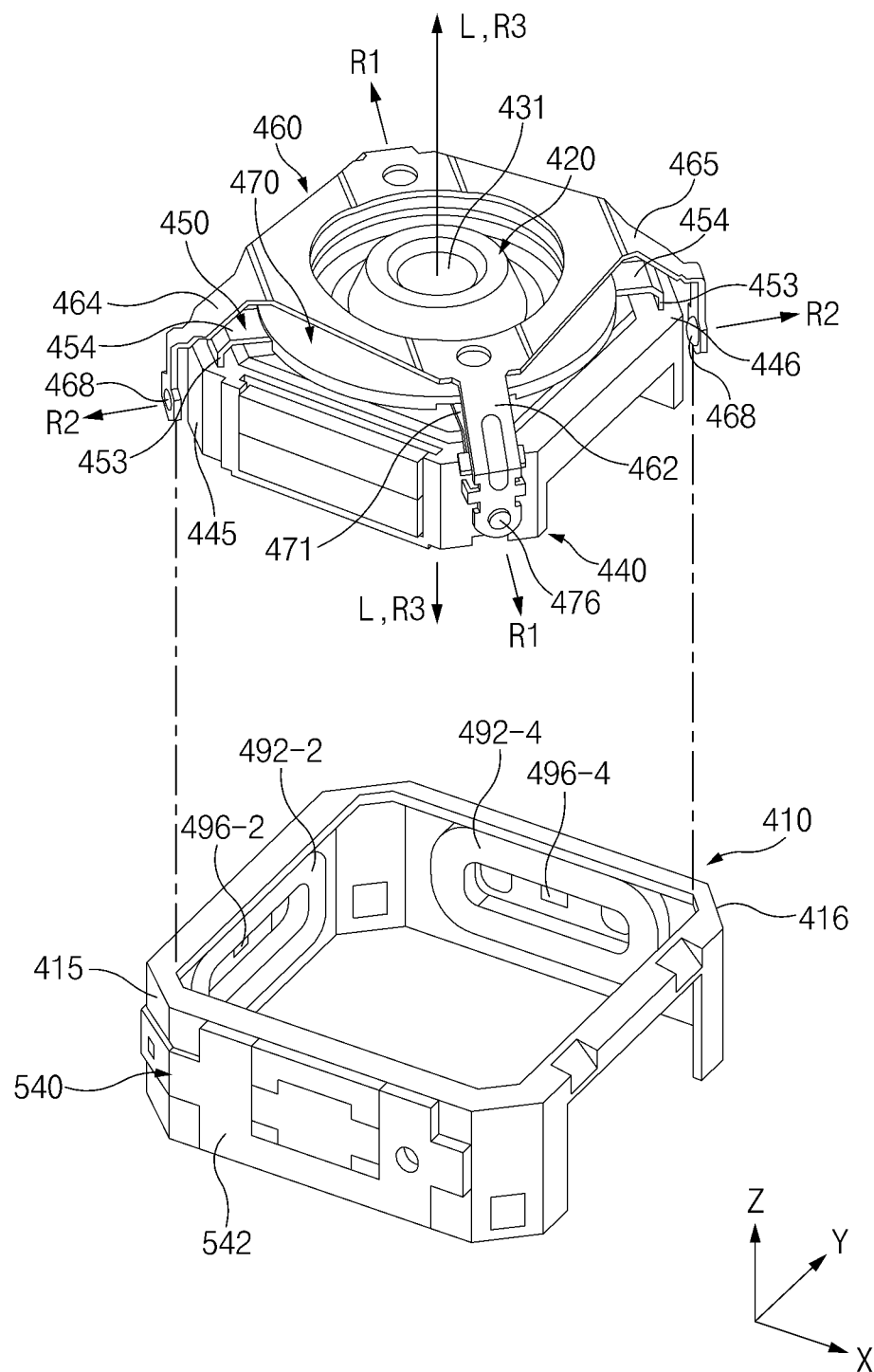
FIG. 10A is a view illustrating the camera housing, the camera assembly, and the guide plate of the camera module according to an example embodiment.
Figure 10B:
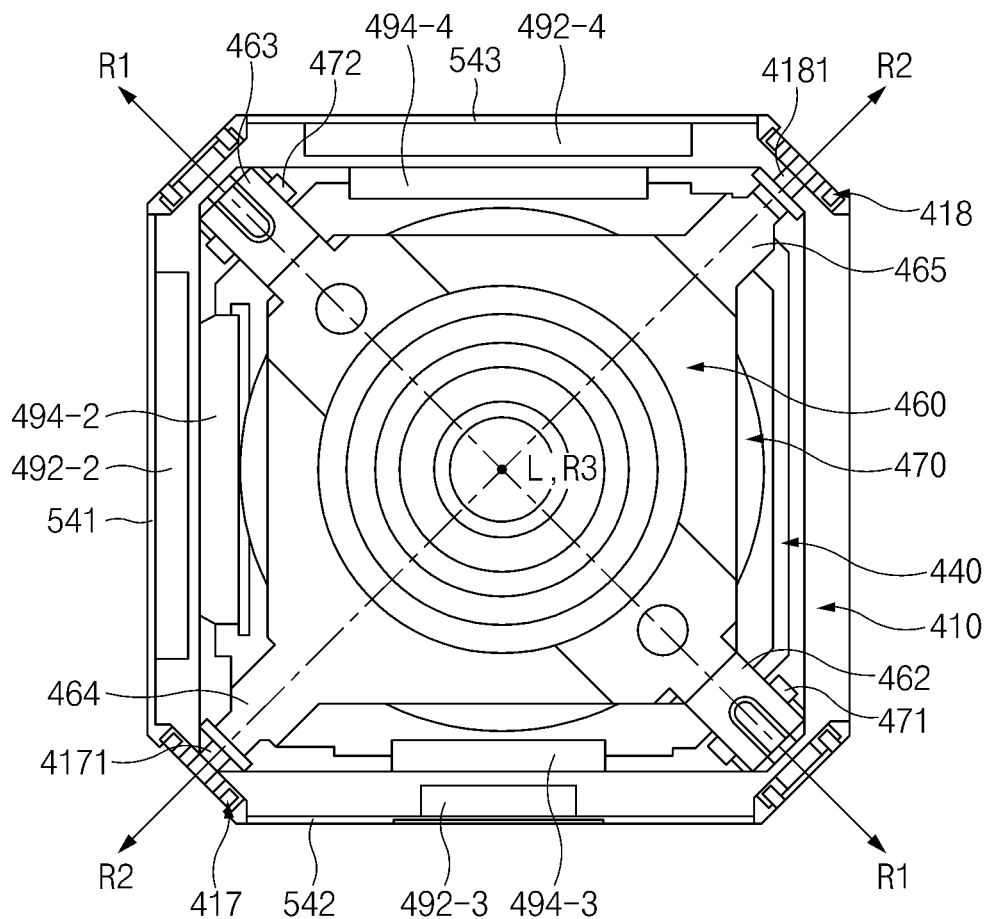
FIG. 10B is a view illustrating the camera housing, the camera assembly, and the guide plate of the camera module according to an example embodiment.

In various embodiments, the support portions 467 may be connected to the support structures (e.g., the first support structure 417 and the second support structure 418 of FIG. 10B) of the first camera housing (e.g., the first camera housing 410 of FIGS. 6 and 10).

In various embodiments, the support portions 467 may have first receiving portions 468 formed therein in which support protrusions (e.g., support protrusions 4171 and 4181 of FIG. 10B) formed on the first support structure 417 and the second support structure 418 are accommodated. For example, the first receiving portions 468 may be formed in a shape at least partially corresponding to the support protrusions 4171 and 4181. In an embodiment, the first receiving portions 468 may be formed on outer surfaces of the support portions 467. For example, inner surfaces of the support portions 467 may be surfaces substantially facing toward the opening area 4611, and the outer surfaces may be surfaces facing away from the inner surfaces.

In an embodiment, the third guide plate 470 may include a third central portion 473 having the opening area 4731 formed therein, and the seventh connecting portion 471 and the eighth connecting portion 472 that extend in the direction of the first rotational axis R1 from the third central portion 473.

In an embodiment, the third guide plate 470 may be coupled to the second guide plate 460 in the direction of the first rotational axis R1. In an embodiment, the seventh connecting portion 471 and the eighth connecting portion 472 may be connected to the second guide plate 460. For example, the seventh connecting portion 471 may be connected to the third connecting portion 462 so as to be rotatable about the first rotational axis R1 relative to the second guide plate 460. The eighth connecting portion 472 may be connected to the fourth connecting portion 463 so as to be rotatable about the first rotational axis R1 relative to the second guide plate 460.

In an embodiment, the seventh connecting portion 471 and the eighth connecting portion 472 may include a flat surface substantially facing toward the first rotational axis R1. In various embodiments, at least a portion of the seventh connecting portion 471 may be disposed to substantially face at least a portion of the third connecting portion 462. At least a portion of the eighth connecting portion 472 may be disposed to substantially face at least a portion of the fourth connecting portion 463. For example, partial areas of the flat surfaces included in the seventh connecting portion 471 and the eighth connecting portion 472 may substantially face partial areas of the flat surfaces included in the third connecting portion 462 and the fourth connecting portion 463.

In an embodiment, the seventh connecting portion 471 and the eighth connecting portion 472 may include second receiving portions 475 in which at least portions of the rotation pins (e.g., the rotation pins 476 of FIG. 9) are accommodated. For example, the second receiving portions 475 in which the rotation pins 476 are accommodated may be formed in partial areas of the flat surfaces of the seventh connecting portion 471 and the eighth connecting portion 472 such that the second guide plate 460 is coupled, directly or indirectly, so as to be rotatable. For example, the seventh connecting portion 471 and the eighth connecting portion 472 may be disposed to at least partially face the third connecting portion 462 and the fourth connecting portion 463, respectively, and at least portions of the rotation pins 476 may pass through the rotation-pin receiving holes 466 and may be accommodated in the second receiving portions 475. The third guide plate 470 may be connected to the second guide plate 460 through the rotation pins 476 so as to be rotatable about the first rotational axis R1.

In an embodiment, the third central portion 473 of the third guide plate 470 may include an upper surface 473-1 and a side surface 473-2 extending from the upper surface 473-1. For example, the side surface 473-2 may extend substantially in the −Z-axis direction along the periphery of the upper surface 473-1.

In an embodiment, the cut-away portions 474 may be formed in the side surface 473-2. For example, the cut-away portions 474 may be formed in the direction of the second rotational axis R2 such that the stopping portions 454 of the first guide plate 450 are disposed therein. For example, the cut-away portions 474 may be formed by cutting partial areas of the side surface 473-2 in the direction of the second rotational axis R2. In an embodiment, each of the cut-away portions 474 may include a first stopper 477-1 and a second stopper 477-2 substantially facing the first stopper 477-1. For example, when the third guide plate 470 is viewed in the direction of the second rotational axis R2, the first stopper 477-1 may be formed on a left side of the cut-away portion 474, and the second stopper 477-2 may be formed on a right side of the cut-away portion 474.

In various embodiments, the third guide plate 470 may be coupled, directly or indirectly, between the upper fixed plate 450-2 and the lower fixed plate 450-1 so as to be rotatable about the first rotational axis R1 and the second rotational axis R2 together with the first guide plate 450. In various embodiments, the third guide plate 470 may be rotatable about the third rotational axis R3 relative to the first guide plate 450.

In an embodiment, the guide plate 450, 460, and 470 may further include the bearing structure 479 for rotating the camera assembly 420 about the third rotational axis R3. In an embodiment, the bearing structure 479 may be disposed between the first guide plate 450 and the third guide plate 470 in the direction of the third rotational axis R3. In various embodiments, the bearing structure 479 may be fixed to at least one of the first guide plate 450 or the third guide plate 470 such that the first guide plate 450 and the third guide plate 470 rotate relative to each other about the third rotational axis R3.

In an embodiment, the bearing structure 479 may include a plurality of bearings 479-1 and a bearing support member 479-2 supporting the bearings 479-1.

In an embodiment, the plurality of bearings 479-1 may be disposed between the first guide plate 450 and the third guide plate 470. The plurality of bearings 479-1 may provide a rolling frictional force between the first guide plate 450 and the third guide plate 470 such that the first guide plate 450 rotates about the third rotational axis R3 relative to the third guide plate 470 when the camera assembly 420 rotates about the third rotational axis R3.

In an embodiment, the bearing support member 479-2 may be formed in a circular plate shape having an opening area 4791 formed at the center thereof. In various embodiments, the bearing support member 479-2 may have, in a peripheral portion thereof, a plurality of through-holes 4792 in which the bearings 479-1 are disposed so as to be rotatable. For example, as many through-holes 4792 as the bearings 479-1 may be formed in a shape corresponding to the bearings 479-1. For example, the bearings 479-1 disposed in the through-holes 4792 may provide the rolling frictional force while rotating. In various embodiments, the bearing support member 479-2 may be fixed to the lower fixed plate 450-1 included in the first guide plate 450 such that rotation is limited, or may be fixed to the third guide plate 470 such that rotation is limited.

FIG. 10 is a view illustrating the camera housing, the camera assembly, and the guide plate of the camera module according to an embodiment.

FIG. 10A is a perspective view illustrating a coupling relationship between the first camera housing, the camera assembly, and the guide plate. FIG. 10B is a plan view illustrating a state in which the first camera housing, the camera assembly, and the guide plate are coupled.

Referring to FIG. 10, the camera module 400 may include the first camera housing 410, the camera assembly 420 disposed in the first camera housing 410, and the guide plate 450, 460, and 470 coupled to the first camera housing 410 and the camera assembly 420 such that the camera assembly 420 is rotatable about the rotational axes R1, R2, and R3.

Figure 8A:
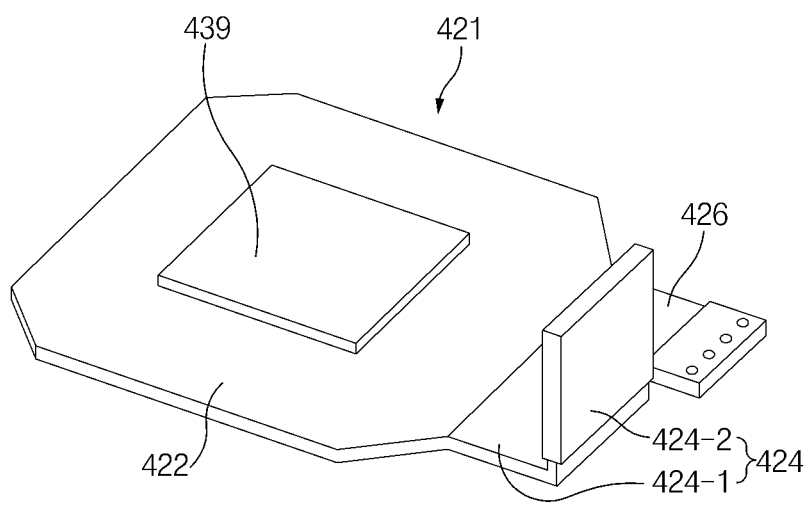
Figure 8B:
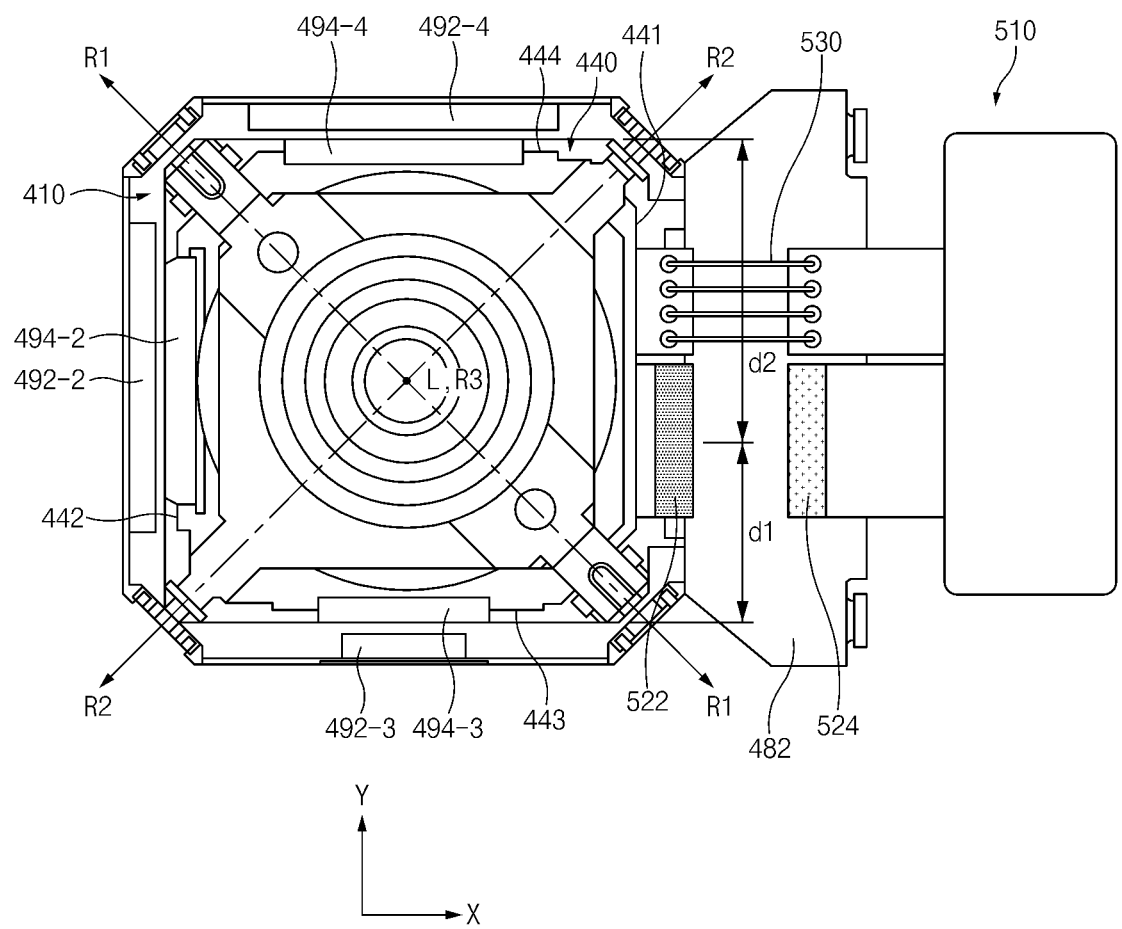
FIG. 8B is a view illustrating the first printed circuit board, the second printed circuit board, and the wireless communication module of the camera module according to an example embodiment.

In an embodiment, the guide plate 450, 460, and 470 may be coupled, directly or indirectly, to the camera assembly 420 and the first camera housing 410 such that, when the camera assembly 420 is viewed in the direction of the optical axis L of the lens 431, at least a part of the central portions (e.g., the first central portion 455, the second central portion 461, and the third central portion 473 of FIG. 8) of the guide plate 450, 460, and 470 overlaps the camera assembly 420 and the lens 431 is exposed through the opening areas (e.g., the opening areas 4551, 4581, 4611, and 4731 of FIG. 8).

In an embodiment, the first guide plate 450 may be connected to the holder 440 included in the camera assembly 420 in the direction of the first rotational axis R1. For example, the insertion portions 453 of the first guide plate 450 may be inserted into the insertion openings of the holder 440 (e.g., the insertion openings 447 of FIG. 5).

In an embodiment, the second guide plate 460 may be connected to the third guide plate 470 in the direction of the first rotational axis R1 and may be connected to the first camera housing 410 in the direction of the second rotational axis R2.

In an embodiment, the third connecting portion 462 of the second guide plate 460 may be connected to the seventh connecting portion 471 of the third guide plate 470. For example, the fourth connecting portion 463 of the second guide plate 460 may be connected to the eighth connecting portion 472 of the third guide plate 470. In an embodiment, the third connecting portion 462 and the fourth connecting portion 463 may be connected to the seventh connecting portion 471 and the eighth connecting portion 472 through the rotation pins 476, respectively, in the direction of the first rotational axis R1 (e.g., refer to FIG. 12).

In an embodiment, the fifth connecting portion 464 and the sixth connecting portion 465 of the second guide plate 460 may be connected to the first support structure 417 and the second support structure 418 formed in the first camera housing 410. In various embodiments, the first support structure 417 and the second support structure 418 may include the support protrusions 4171 and 4181 substantially protruding toward the camera assembly 420. For example, the support protrusions 4171 and 4181 may be formed in the direction of the second rotational axis R2 such that the fifth connecting portion 464 and the sixth connecting portion 465 are connected to the first camera housing 410 in the direction of the second rotational axis.

In various embodiments, at least portions of the support protrusions 4171 and 4181 may be formed in a shape substantially corresponding to the first receiving portions 468 formed in the fifth connecting portion 464 and the sixth connecting portion 465 (e.g., refer to FIG. 11).

In an embodiment, the rotation pins 476 may connect the second guide plate 460 and the third guide plate 470 to form the first rotational axis R1. In various embodiments, as the second guide plate 460 and the third guide plate 470 are connected through the rotation pins 476, the third guide plate 470 may rotate about the first rotational axis R1 relative to the second guide plate 460. In an embodiment, the support protrusions 4171 and 4181 of the first camera housing 410 may be connected to the first receiving portions 468 of the second guide plate 460 to form the second rotational axis R2.

In various embodiments, the camera assembly 420 may be coupled, directly or indirectly, to the first camera housing 410 so as to be rotatable about the three rotational axes R1, R2, and R3 through a direct and/or indirect coupling between the camera assembly 420, the guide plate 450, 460, and 470, and the first camera housing 410. For example, the camera assembly 420 and the first guide plate 450 may be coupled, the first guide plate 450 and the third guide plate 470 may be coupled, the third guide plate 470 may be coupled with the second guide plate 460, and the second guide plate 460 may be coupled with the first camera housing 410.

In various embodiments, when the camera assembly 420 rotates about the first rotational axis R1, the second guide plate 460 may be fixed and/or constrained to the first camera housing 410 with respect to the rotation of the camera assembly 420 because the second guide plate 460 is coupled with the first camera housing 410 in the direction of the second rotational axis R2. In this case, the first guide plate 450 and the third guide plate 470 may rotate together with the camera assembly 420 because the third guide plate 470 is coupled to be rotatable about the first rotational axis R1 relative to the second guide plate 460.

In various embodiments, when the camera assembly 420 rotates about the second rotational axis R2, the second guide plate 460 and the third guide plate 470 may rotate together because the second guide plate 460 is coupled with the third guide plate 470 in the direction of the first rotational axis R1. In this case, the first guide plate 450, the second guide plate 460, and the third guide plate 470 may rotate together with the camera assembly 420 because the second guide plate 460 is coupled to be rotatable about the second rotational axis R2 relative to the first camera housing 410.

In various embodiments, when the camera assembly 420 rotates about the third rotational axis R3, the second guide plate 460 and the third guide plate 470 may be fixed and/or constrained to the first camera housing 410 with respect to the rotation of the camera assembly 420 because the second guide plate 460 is coupled with the first camera housing 410 and the third guide plate 470 is coupled with the second guide plate 460. In this case, the first guide plate 450 may rotate together with the camera assembly 420 because the first guide plate 450 is coupled to be rotatable about the third rotational axis R3 relative to the third guide plate 470.

Referring to FIG. 10, in an embodiment, the camera module 400 may include a fourth printed circuit board 540 surrounding at least a portion of the first camera housing 410.

In an embodiment, the fourth printed circuit board 540 may surround at least portions of the second side surface (e.g., the second side surface 412 of FIG. 6), the third side surface (e.g., the third side surface 413 of FIG. 6), and the fourth side surface (e.g., the fourth side surface 414 of FIG. 6) of the first camera housing 410. For example, the fourth printed circuit board 540 may include a first area 541 surrounding a portion of the second side surface 412, a second area 542 surrounding a portion of the third side surface 413, and a third area 543 surrounding a portion of the fourth side surface 414.

In an embodiment, the first area 541 may be located between the second area 542 and the third area 543. The second area 542 and the third area 543 may be formed to face each other. In various embodiments, the first area 541 may face a direction perpendicular to the direction that the second area 542 or the third area 543 faces.

In an embodiment, the second coil 492-2 may be disposed on the first area 541. The third coil 492-3 may be disposed on the second area 542. The fourth coil 492-4 may be disposed on the third area 543. In various embodiments, the second coil 492-2, the third coil 492-3, and the fourth coil 492-4 may interact with the second magnetic body 494-2, the third magnetic body 494-3, and the fourth magnetic body 494-4 disposed on the camera assembly 420.

In various embodiments, the camera module 400 may rotate the camera assembly 420 about at least one of the first rotational axis R1, the second rotational axis R2, or the third rotational axis R3 using the interaction between the second coil 492-2 and the second magnetic body 494-2, the interaction between the third coil 492-3 and the third magnetic body 494-3, and/or the interaction between the fourth coil 492-4 and the fourth magnetic body 494-4. For example, the camera assembly 420 may rotate about the first rotational axis R1 through the second coil 492-2 and the second magnetic body 494-2, may rotate about the second rotational axis R2 through the third coil 492-3 and the third magnetic body 494-3, and may rotate about the third rotational axis R3 through the fourth coil 492-4 and the fourth magnetic body 494-4.

However, the scope is not necessarily limited thereto, and according to various embodiments, rotary drive sources for the respective rotational axes R1, R2, and R3 may be changed. For example, the third coil 492-3 and the third magnetic body 494-3 may function as a drive source for rotation about the third rotational axis R3, and the fourth coil 492-4 and the fourth magnetic body 494-4 may function as a drive source for rotation about the second rotational axis R2.

In an embodiment, a plurality of sensors 496-2 and 496-4 may be disposed on the first camera housing 410. The plurality of sensors 496-2 and 496-4 may include the second sensor 496-2 disposed in the second coil 492-2, a third sensor (not illustrated) disposed in the third coil 492-3, and the fourth sensor 496-4 disposed in the fourth coil 492-4.

In various embodiments, the second sensor 496-2 may be disposed adjacent, directly indirectly, to the second magnetic body 494-2 to sense the position of the second magnetic body 494-2. The third sensor may be disposed adjacent, directly indirectly, to the third magnetic body 494-3 to sense the position of the third magnetic body 494-3. The fourth sensor 496-4 may be disposed adjacent, directly indirectly, to the fourth magnetic body 494-4 to sense the position of the fourth magnetic body 494-4.

In various embodiments, the plurality of sensors 496-2 and 496-4 may sense a rotation angle of the camera assembly 420. For example, at least one of the second sensor 496-2, the third sensor (not illustrated), or the fourth sensor 496-4 may sense a rotation angle (e.g., a movement range) by which the camera assembly 420 moves with respect to the rotational axes R1, R2, and R3. For example, the electronic device (e.g., the processor 120 of FIG. 1 or the image signal processor 260 of FIG. 2) may perform a shake compensation function (e.g., an image stabilization function) of the camera module 400, based on a rotation angle identified by using the second sensor 496-2, the third sensor (not illustrated), and the fourth sensor 496-4. In various embodiments, the plurality of sensors 496-2 and 496-4 may include a Hall sensor.

Figure 13A:
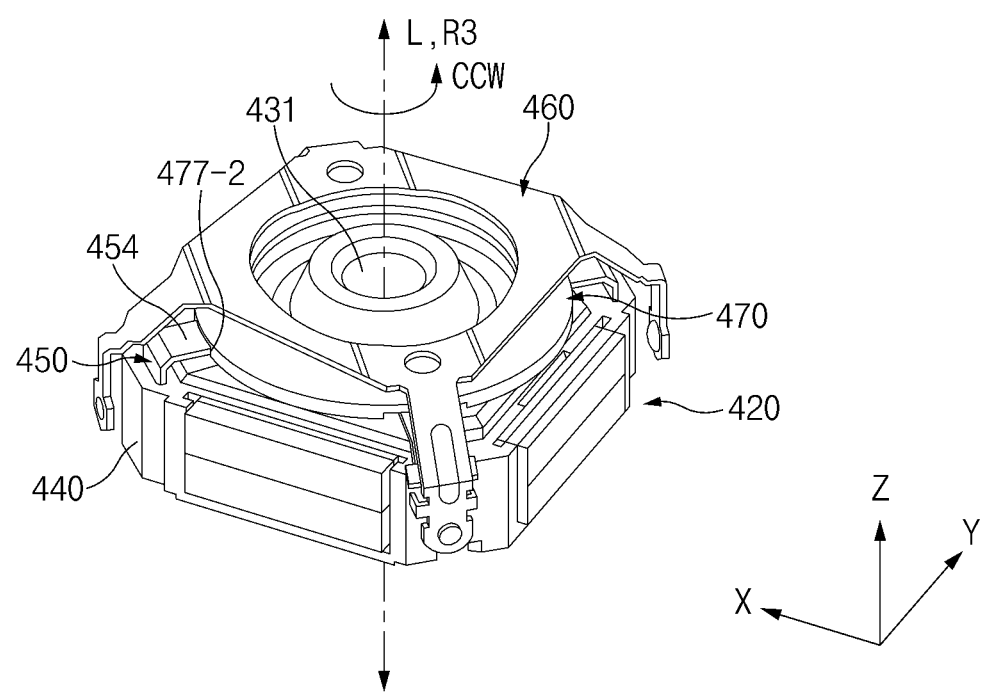
FIGS. 13A and 13B are views illustrating a third rotational operation of the camera module according to an example embodiment.

FIG. 11 is a view illustrating the first rotational operation of the camera module according to an embodiment. FIG. 12 is a view illustrating the second rotational operation of the camera module according to an embodiment. FIG. 13 is a view illustrating a third rotational operation of the camera module according to an embodiment.

Referring to FIGS. 11 to 13, the camera module 400 may simultaneously or sequentially perform the first rotational operation of rotating about the first rotational axis R1 (e.g., refer to FIG. 11), the second rotational operation of rotating about the second rotational axis R2 (e.g., refer to FIG. 12), and/or the third rotational operation of rotating about the third rotational axis R3 (e.g., refer to FIG. 13). For example, simultaneously performing at least two of the first rotational operation, the second rotational operation, and the third rotational operation may be understood as rotation of the camera assembly 420 about the center of rotation C.

In an embodiment, the camera module 400 may include the first camera housing 410 including the first support structure 417 and the second support structure 418, the lens 431, the image sensor 439, the camera assembly 420 including the first corner portion 445 and the second corner portion 446, and the guide plate 450, 460, and 470 coupled to the first support structure 417, the second support structure 418, the first corner portion 445, and the second corner portion 446.

In an embodiment, the guide plate 450, 460, and 470 may include the first guide plate 450 coupled to the first corner portion 445 and the second corner portion 446, the second guide plate 460 coupled to the first support structure 417 and the second support structure 418, and the third guide plate 470 coupled to the first guide plate 450 and the second guide plate 460.

In an embodiment, the first guide plate 450 may include the first connecting portion 451 and the second connecting portion 452 coupled to the first corner portion 445 and the second corner portion 446.

In an embodiment, the second guide plate 460 may include the fifth connecting portion 464 and the sixth connecting portion 465 coupled to the first support structure 417 and the second support structure 418. Furthermore, the second guide plate 460 may include the third connecting portion 462 and the fourth connecting portion 463 that are coupled to the third guide plate 470.

In an embodiment, the third guide plate 470 may include the seventh connecting portion 471 and the eighth connecting portion 472 coupled to the third connecting portion 462 and the fourth connecting portion 463. For example, the support protrusions 4171 and 4181 may be formed on the first support structure 417 and the second support structure 418, and the first receiving portions 468 may be formed in the second guide plate 460. For example, the third connecting portion 462 and the fourth connecting portion 463 may be connected with the seventh connecting portion 471 and the eighth connecting portion 472 through the rotation pins 476, the rotation-pin receiving holes 466 may be formed in the third connecting portion 462 and the fourth connecting portion 463, and the second receiving portions 475 may be formed in the seventh connecting portion 471 and the eighth connecting portion 472.

Referring to FIG. 11, in a default state (e.g., FIG. 11A), the camera module 400 may perform the first rotational operation to rotate about the first rotational axis R1.

In the first rotational operation, the camera assembly 420 may rotate relative to the first camera housing 410 and the second guide plate 460. For example, the camera assembly 420 may rotate about the first rotational axis R1 in the state in which the second guide plate 460 is fixed and/or constrained to the first camera housing 410 in the direction of the second rotational axis R2.

In the first rotational operation, the first guide plate 450 and the third guide plate 470, together with the camera assembly 420, may rotate relative to the first camera housing 410 and the second guide plate 460.

Referring to FIG. 11, the second guide plate 460 may be fixed and/or constrained to the first camera housing 410, and the camera assembly 420, the first guide plate 450, and the third guide plate 470 may rotate together about the first rotational axis R1. The second guide plate 460 may remain in the same state irrespective of the rotation of the camera assembly 420.

According to an embodiment, in the first rotational operation, the second rotational axis R2 may form a predetermined angle other than 90 degrees with respect to the optical axis L of the lens 431. For example, in the default state (e.g., FIG. 11A), the first rotational axis R1 and the second rotational axis R2 may form a substantially right angle (e.g., 90 degrees) with the optical axis L of the lens 431, and as the first rotational operation is performed, the second rotational axis R2 and the optical axis L of the lens 431 may form an angle (e.g., 90-θ) other than 90 degrees.

As the first rotational operation is performed, the optical axis L of the lens 431 may be spaced apart from the Z-axis direction by the predetermined angle θ. In various embodiments, the Z-axis may correspond to the optical axis L of the lens 431 in the default state (e.g., FIG. 11A). In various embodiments, the angle θ may be greater than or equal to 0 degrees and smaller than 10 degrees.

Referring to FIG. 11, when the camera assembly 420 rotates about the first rotational axis R1, the gaps d1, d2, and d3 between the first guide plate 450 and the second guide plate 460 may vary.

For example, in the default state (e.g., FIG. 11A) in which the camera assembly 420 is not rotated, the second guide plate 460 and the first guide plate 450 may have the first gap d1 therebetween. In a state (e.g., FIG. 11B) in which the camera assembly 420 is rotated, the second guide plate 460 and the first guide plate 450 may have the second gap d2 and the third gap d3 that are different from the first gap d1.

In the illustrated embodiment, a partial area of the second central portion 461 that extends to the fifth connecting portion 464 of the second guide plate 460 may be spaced apart from the first guide plate 450 by the second gap d2, and a partial area of the second central portion 461 that extends to the sixth connecting portion 465 of the second guide plate 460 may be spaced apart from the first guide plate 450 by the third gap d3 greater than the second gap d2. For example, left portions of the first guide plate 450 and the second guide plate 460 with respect to the optical axis L of the lens 431 may form the second gap d2, and right portions of the first guide plate 450 and the second guide plate 460 with respect to the optical axis L of the lens 431 may form the third gap d3. In various embodiments, the second gap d2 may be smaller than the first gap d1, and the third gap d3 may be greater than the first gap d1.

Referring to FIG. 12, in a default state (e.g., FIG. 12A), the camera module 400 may perform the second rotational operation to rotate about the second rotational axis R2.

In the second rotational operation, the camera assembly 420, together with the guide plate 450, 460, and 470, may rotate relative to the first camera housing 410. For example, the second guide plate 460 may be coupled to the third guide plate 470 in the direction of the first rotational axis R1 at the same as being coupled so as to be rotatable about the second rotational axis R2 relative to the first camera housing 410 (e.g., refer to FIG. 11). Accordingly, the camera assembly 420, the first guide plate 450, the second guide plate 460, and the third guide plate 470 may rotate together about the second rotational axis R2.

According to an embodiment, in the second rotational operation, the first rotational axis R1 may remain substantially perpendicular to the optical axis L of the lens 431. For example, in the default state (e.g., FIG. 12A), the first rotational axis R1 and the second rotational axis R2 may form a substantially right angle (e.g., 90 degrees) with the optical axis L of the lens 431, and the first rotational axis R1 and the optical axis L of the lens 431 may remain substantially perpendicular to each other irrespective of the second rotational operation.

As the second rotational operation is performed, the optical axis L of the lens 431 may be spaced apart from the Z-axis direction by the predetermined angle θ. In various embodiments, the Z-axis may correspond to the optical axis L of the lens 431 in the default state (e.g., FIG. 12A). In various embodiments, the angle θ may be greater than or equal to 0 degrees and smaller than 10 degrees.

Referring to FIG. 12, when the camera assembly 420 rotates about the second rotational axis R2, the gap d between the first guide plate 450 and the second guide plate 460 may be substantially the same.

Referring to FIG. 13, in a default state (e.g., FIG. 10A), the camera module 400 may perform the third rotational operation to rotate about the third rotational axis R3.

In the third rotational operation, the camera assembly 420, together with the first guide plate 450, may rotate relative to the first camera housing 410, the second guide plate 460, and the third guide plate 470. For example, as the second guide plate 460 is coupled to the first camera housing (e.g., the first camera housing 410 of FIGS. 11 and 12) in the direction of the second rotational axis R2 and the third guide plate 470 is coupled to the second guide plate 460 in the direction of the first rotational axis R1, the second guide plate 460 and the third guide plate 470 may be fixed and/or constrained to the first camera housing 410 with respect to rotation about the third rotational axis R3. In this case, the first guide plate 450 may be rotated relative to the third guide plate 470 by the bearing structure (e.g., the bearing structure 479 of FIGS. 9, 11, and 12), and the camera assembly 420 may rotate together accordingly. In various embodiments, the first guide plate 450 may be connected to the holder 440 included in the camera assembly 420 to rotate together with the camera assembly 420.

Figure 13B:
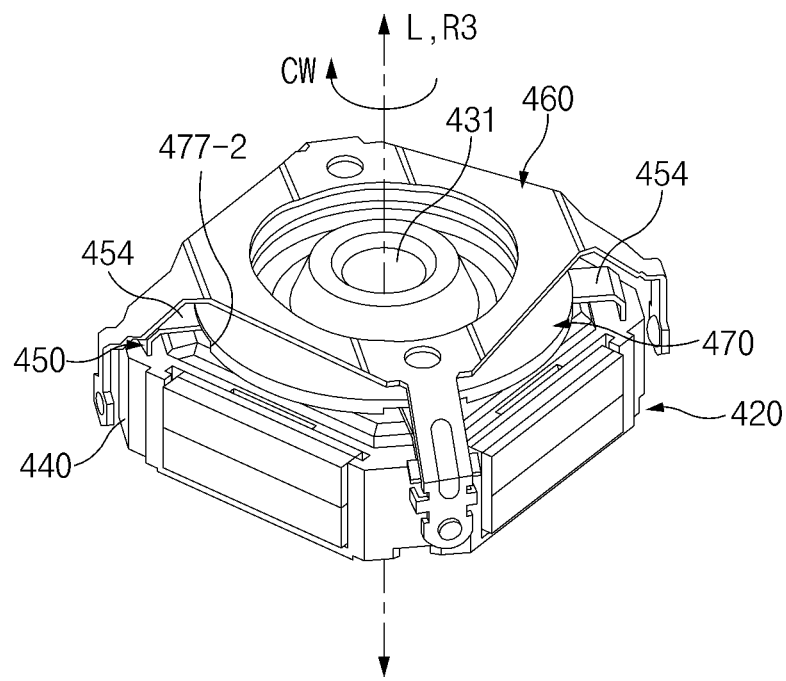

In an embodiment, the camera assembly 420 may rotate about the third rotational axis R3 by a predetermined angle in the counterclockwise direction CCW (e.g., refer to FIG. 13A) and may rotate about the third rotational axis R3 by a predetermined angle in the clockwise direction CW (e.g., refer to FIG. 13B). In various embodiments, the rotation angle in the counterclockwise direction CCE may be substantially similar to or the same as the rotation angle in the clockwise direction CW.

In an embodiment, the rotation angle of the camera assembly 420 in the clockwise or counterclockwise direction may be limited to a predetermined range by the stopping portions 454 of the first guide plate 450 and the cut-away portions 474 of the third guide plate 470. For example, the camera assembly 420 may rotate in the counterclockwise direction CCW until the stopping portions 454 make contact with the second stoppers 477-2 (e.g., refer to FIG. 9) of the cut-away portions 474. For example, the camera assembly 420 may rotate in the clockwise direction CW until the stopping portions 454 make contact with the first stoppers (e.g., the first stoppers 477-1 of FIG. 8) of the cut-away portions 474.

Figure 14:
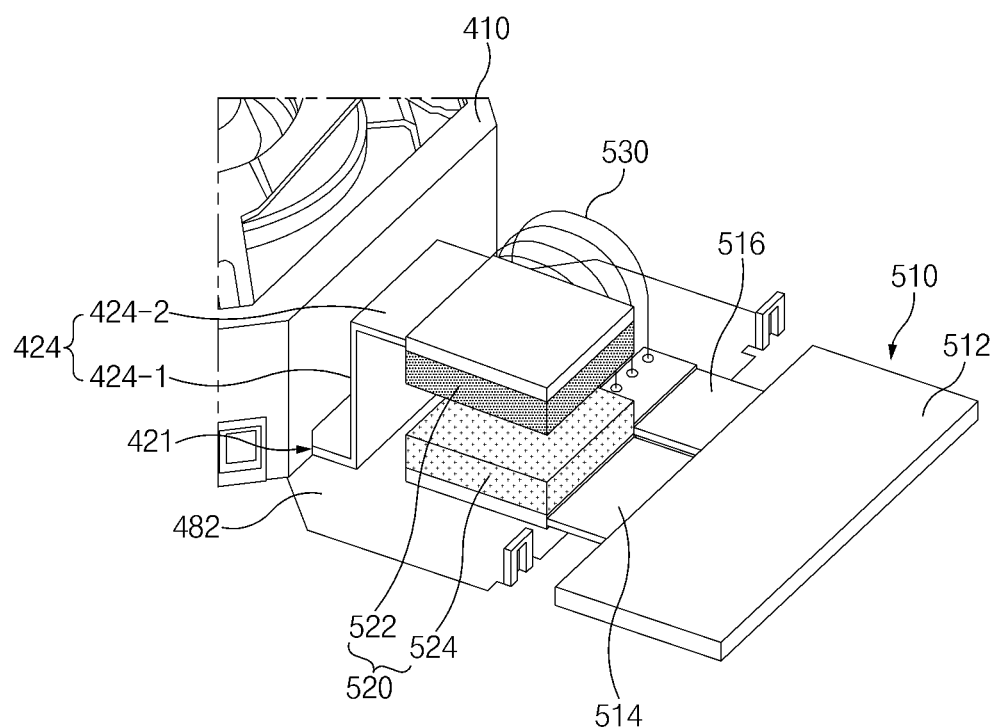
FIG. 14 is a view illustrating a first printed circuit board, a second printed circuit board, and a wireless communication module of a camera module according to various example embodiments.

FIG. 14 is a view illustrating a first printed circuit board, a second printed circuit board, and a wireless communication module of a camera module according to various embodiments.

FIG. 14 is a view illustrating an embodiment in which the position and/or direction in which the wireless communication module 520 is disposed is modified in the embodiment illustrated in FIGS. 5, 6, and 8. At least one of components of FIG. 14 may be identical and/or similar to at least one of the components illustrated in FIGS. 5, 6, and 8, and in describing FIG. 14, repetitive descriptions identical to ones given above will be omitted.

Referring to FIG. 14, the camera module 400 may include the first printed circuit board 421, at least a portion of which is disposed in a first camera housing 410, the second printed circuit board 510, at least a portion of which is disposed on a second area 482 of a base plate (e.g., the base plate 480-1 of FIG. 5), a first wireless communication module 522 disposed on the first printed circuit board 421, a second wireless communication module 524 disposed on the second printed circuit board 510, and a cable 530 connecting the first printed circuit board 421 and the second printed circuit board 510.

In various embodiments, the shape of the first printed circuit board 421 or the second printed circuit board 510 of the camera module 400 may be modified, and the direction in which the wireless communication module 520 is disposed may be modified. For example, unlike in FIG. 8, the wireless communication module 520 may be disposed substantially perpendicular to an optical axis (e.g., the optical axis L of FIG. 6) of a lens (e.g., the lens 431 of FIG. 6) in the embodiment illustrated in FIG. 14.

In an embodiment, the first printed circuit board 421 may include a first extending portion 424 extending from a base portion (e.g., the base portion 422 of FIG. 8A). In an embodiment, the first extending portion 424 of the first printed circuit board 421 may include a first portion 424-1 extending in a direction substantially perpendicular to the base portion 422 and a second portion 424-2 extending in a direction substantially perpendicular to the first portion 424-1. For example, the second portion 424-2 may extend substantially parallel to the base portion 422 or the second area 482. For example, the second portion 424-2 may be disposed substantially perpendicular to the optical axis L.

In an embodiment, the second printed circuit board 510 may include a base portion 512, and a first extending portion 514 and a second extending portion 516 that extend from the base portion 512. The first extending portion 514 and the second extending portion 516 may extend in a form branching from the base portion 512. In an embodiment, the first extending portion 514 and the second extending portion 516 of the second printed circuit board 510 may extend substantially parallel to the base portion 512. For example, the first extending portion 514 or the second extending portion 516 may extend substantially parallel to the second area 482. For example, the first extending portion 514 or the second extending portion 516 may be disposed substantially perpendicular to the optical axis L.

In various embodiments, the second portion 424-2 included in the first extending portion 424 of the first printed circuit board 421 and at least a portion of the first extending portion 514 of the second printed circuit board 510 may be disposed to face each other in a direction parallel to the optical axis L.

In an embodiment, the wireless communication module 520 may be disposed on the first printed circuit board 421 and/or the second printed circuit board 510. For example, the first wireless communication module 522 may be disposed on the second portion 424-2 included in the first extending portion 424 of the first printed circuit board 421. The second wireless communication module 524 may be disposed on at least a portion of the first extending portion 514 of the second printed circuit board 510 to face the first wireless communication module 522. In various embodiments, the first wireless communication module 522 and the second wireless communication module 524 may be aligned in a direction perpendicular to the second area 482 (e.g., a direction parallel to the optical axis L). For example, the first wireless communication module 522 and the second wireless communication module 524 may be disposed substantially perpendicular to the optical axis L.

In various example embodiments, the wireless communication module 520 of the camera module 400 may be disposed perpendicular to the optical axis L of the lens 431. According to the various embodiments, rotation of the camera module 400 may be implemented with a simple structure as in the embodiment (e.g., refer to FIG. 8) in which the wireless communication module 520 is disposed parallel to the optical axis L.

FIG. 15 is a view illustrating a first printed circuit board, a second printed circuit board, and a wireless communication module of a camera module according to various embodiments.

FIG. 15 is a view illustrating an embodiment in which a third wireless communication module and a fourth wireless communication module are additionally included in the above embodiments (e.g., refer to FIGS. 5, 6, 8, and 14). At least one of components of FIG. 15 may be identical and/or similar to at least one of the components described in the above embodiments, and in describing FIG. 15, repetitive descriptions identical to ones given above will be omitted.

Referring to FIG. 15, the camera module 400 may include a camera assembly 420, the first printed circuit board 421, the second printed circuit board 510, a first wireless communication module 522, a second wireless communication module 524, the third wireless communication module 526, the fourth wireless communication module 528, and a cable 530.

In an embodiment, the camera assembly 420 may include an assembly case 429 having a lens 431 and a lens barrel 432 accommodated therein. In an embodiment, the first printed circuit board 421 may be disposed on the bottom of the camera assembly 420. The second printed circuit board 510 may at least partially face the first printed circuit board 421. In an embodiment, the cable 530 may connect the first printed circuit board 421 and the second printed circuit board 510.

In an embodiment, the first wireless communication module 522 and the third wireless communication module 526 may be disposed on at least a portion of the first printed circuit board 421. For example, the first wireless communication module 522 may be disposed on a first extending portion 424 of the first printed circuit board 421, and the third wireless communication module 526 may be disposed on a third extending portion 425 of the first printed circuit board 421 so as to be spaced apart from the first wireless communication module 522.

In an embodiment, the second wireless communication module 524 and the fourth wireless communication module 528 may be disposed on at least a portion of the second printed circuit board 510 to face the first wireless communication module 522 and the third wireless communication module 526, respectively. For example, the second wireless communication module 524 may be disposed on a first extending portion 514 of the second printed circuit board 510, and the fourth wireless communication module 528 may be disposed on a third extending portion 515 of the second printed circuit board 510 so as to be spaced apart from the second wireless communication module 524.

In various embodiments, the first wireless communication module 522 may wirelessly transmit and/or receive a signal with the second wireless communication module 524. In various embodiments, the third wireless communication module 526 may wirelessly transmit and/or receive a signal with the fourth wireless communication module 528. In various embodiments, a signal transferred through the first wireless communication module 522 and the second wireless communication module 524 may be configured to differ from a signal transferred through the third wireless communication module 526 and the fourth wireless communication module 528. For example, the first wireless communication module 522 and the second wireless communication module 524 may transmit/receive a signal related to an image, and the third wireless communication module 526 and the fourth wireless communication module 528 may transmit/receive a signal related to an auto focus function.

In an embodiment, the cable 530 may be disposed between the first wireless communication module 522 and the third wireless communication module 526 and/or between the second wireless communication module 524 and the fourth wireless communication module 528. In various embodiments, opposite end portions of the cable 530 may be connected, directly or indirectly, to a second extending portion (e.g., the second extending portion 426 of FIG. 8A) of the first printed circuit board 421 and a second extending portion 516 of the second printed circuit board 510, respectively. For example, the second extending portion 426 of the first printed circuit board 421 may be disposed between the first extending portion 424 and the third extending portion 425 of the first printed circuit board 421. The second extending portion 516 of the second printed circuit board 510 may be disposed between, directly or indirectly, the first extending portion 514 and the third extending portion 515 of the second printed circuit board 510.

In various embodiments, the first extending portions 424 and 514 and the third extending portions 425 and 515 included in the first printed circuit board 421 and the second printed circuit board 510 may be formed to be symmetrical to each other with respect to the second extending portions 426 and 516.

In various embodiments, the first wireless communication module 522, the second wireless communication module 524, the third wireless communication module 526, and the fourth wireless communication module 528 may be disposed substantially parallel to (e.g., refer to FIG. 15A), or substantially perpendicular to (e.g., refer to FIG. 15B), an optical axis of the lens 431 (e.g., the optical axis L of FIG. 6).

Figure 15A:
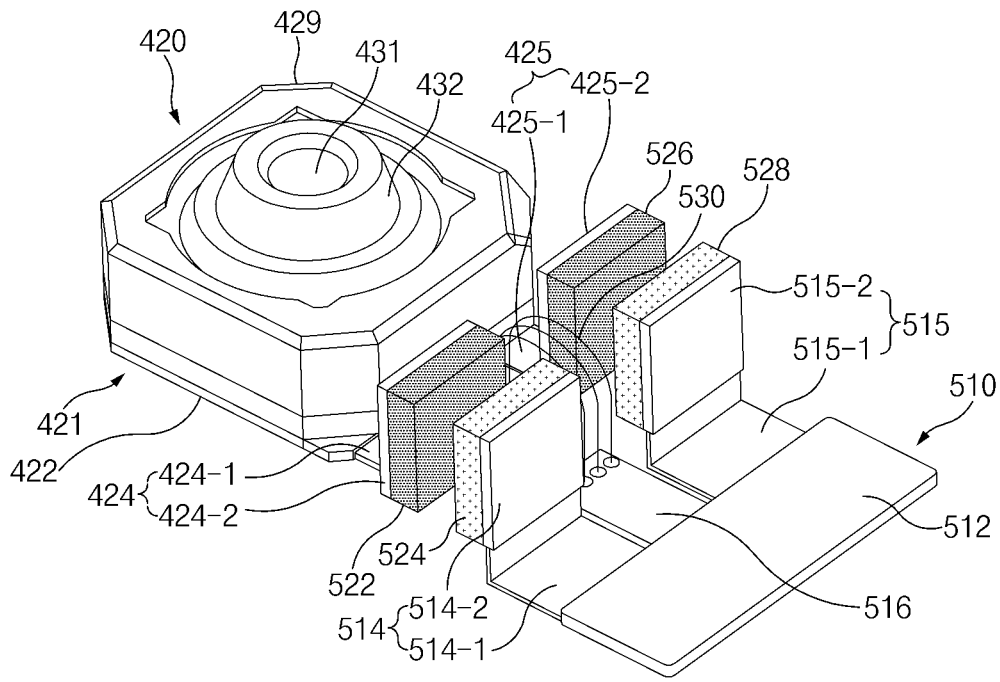
FIGS. 15A and 15B are views illustrating a first printed circuit board, a second printed circuit board, and a wireless communication module of a camera module according to various example embodiments.

First, referring to FIG. 15A, the first wireless communication module 522 and the third wireless communication module 526 may be disposed substantially perpendicular to a base portion 422 of the first printed circuit board 421. Furthermore, the second wireless communication module 524 and the fourth wireless communication module 528 may be disposed substantially perpendicular to a base portion 512 of the second printed circuit board 510.

In an embodiment, the first printed circuit board 421 may include the base portion 422, the first extending portion 424, and the third extending portion 425. The first extending portion 424 and the third extending portion 425 may extend in a form branching from the base portion 422. In an embodiment, the first extending portion 424 and the third extending portion 425 may include first portions 424-1 and 425-1 extending from the base portion 422 in parallel and second portions 424-2 and 425-2 extending in a direction substantially perpendicular to the first portions 424-1 and 425-1. For example, the first wireless communication module 522 may be disposed on the second portion 424-2 of the first extending portion 424, and the third wireless communication module 526 may be disposed on the second portion 425-2 of the third extending portion 425.

In an embodiment, the second printed circuit board 510 may include the base portion 512, the first extending portion 514, the second extending portion 516, and the third extending portion 515. The first extending portion 514, the second extending portion 516, and the third extending portion 515 may extend in a form branching from the base portion 512. In an embodiment, the first extending portion 514 and the third extending portion 515 may include first portions 514-1 and 515-1 extending from the base portion 512 in parallel and second portions 514-2 and 515-2 extending in a direction substantially perpendicular to the first portions 514-1 and 515-1. For example, the second wireless communication module 524 may be disposed on the second portion 514-2 of the first extending portion 514, and the fourth wireless communication module 528 may be disposed on the second portion 515-2 of the third extending portion 515.

Figure 15B:
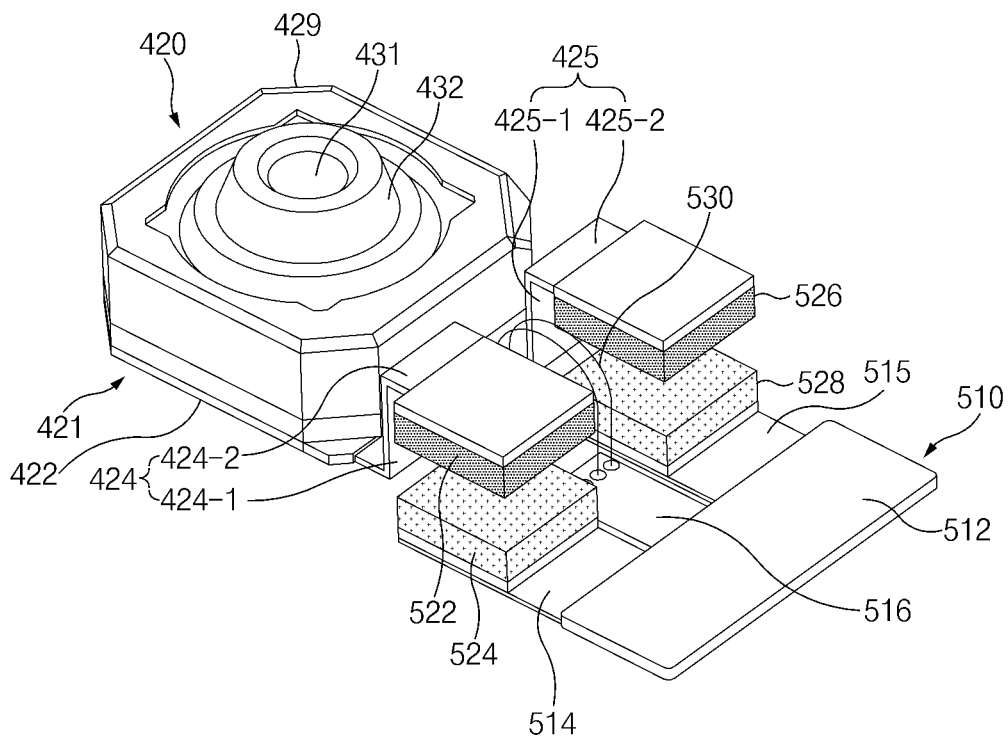

Next, referring to FIG. 15B, the first wireless communication module 522 and the third wireless communication module 526 may be disposed substantially parallel to the base portion 422 of the first printed circuit board 421. Furthermore, the second wireless communication module 524 and the fourth wireless communication module 528 may be disposed substantially parallel to the base portion 512 of the second printed circuit board 510.

In an embodiment, the first extending portion 424 and the third extending portion 425 of the first printed circuit board 421 may include first portions 424-1 and 425-1 vertically extending from the base portion 422 and second portions 424-2 and 425-2 extending in a direction substantially perpendicular to the first portions 424-1 and 425-1. For example, the first wireless communication module 522 may be disposed on the second portion 424-2 of the first extending portion 424, and the third wireless communication module 526 may be disposed on the second portion 425-2 of the third extending portion 425.

In an embodiment, the first extending portion 514 and the third extending portion 515 of the second printed circuit board 510 may extend substantially parallel to the base portion 512. For example, the second wireless communication module 524 may be disposed on a portion of the first extending portion 514, and the fourth wireless communication module 528 may be disposed on a portion of the third extending portion 515.

According to the embodiment illustrated in FIG. 15, the camera module 400 may include two pairs of wireless communication modules (e.g., the first wireless communication module 522, the second wireless communication module 524, the third wireless communication module 526, and the fourth wireless communication module 528) for wirelessly transmitting and/or receiving signals. Accordingly, the camera module 400 may transmit and/or receive various signals related to operations and/or functions of the camera module 400 as separate things through one pair of wireless communication modules different from each other.

A camera module 400 according to an example embodiment may include a camera housing 410 and 480, a camera assembly 420, at least a portion of which is accommodated in the camera housing 410 and 480, the camera assembly 420 including a lens 431, an image sensor 439, and a first printed circuit board (PCB) 421, and the camera assembly 420 being coupled to the camera housing 410 and 480 so as to be rotatable about a center of rotation C of the camera assembly 420, a second printed circuit board 510, at least a portion of which is disposed in the camera housing 410 and 480 to face the first printed circuit board 421, a first wireless communication module 522 disposed on at least a portion of the first printed circuit board 421, and a second wireless communication module 524 disposed on at least a portion of the second printed circuit board 510, and the first wireless communication module 522 and the second wireless communication module 524 may wirelessly transmit and/or receive a signal related to the camera module 400.

In various embodiments, the first wireless communication module 522 and the second wireless communication module 524 may be disposed to at least partially face each other.

In various embodiments, the camera module 400 may further include at least one cable 530 that electrically connects the first printed circuit board 421 and the second printed circuit board 510, and power may be supplied to the camera module 400 through the cable 530.

In various embodiments, the first printed circuit board 421 and the second printed circuit board 510 may include base portions 422 and 512, and first extending portions 424 and 514 and second extending portions 426 and 516 that extend to branch from sides of the base portions 422 and 512. The first wireless communication module 522 may be disposed on the first extending portion 424 of the first printed circuit board 421. The second wireless communication module 524 may be disposed on the first extending portion 514 of the second printed circuit board 510. The cable 530 may be connected to the second extending portion 426 of the first printed circuit board 421 and the second extending portion 516 of the second printed circuit board 510.

In various embodiments, the first extending portions 424 and 514 of the first printed circuit board 421 and the second printed circuit board 510 may include portions (e.g., second portions 424-2 and 514-2) that face a direction substantially perpendicular to the base portions 422 and 512.

In various embodiments, at least a portion of the base portion 422 of the first printed circuit board 421 may be electrically connected with the image sensor 439, and the base portion 512 of the second printed circuit board 510 may include a connector electrically connected with an external circuit board (e.g., the printed circuit board 350 of FIG. 3C) disposed outside the camera housing 410 and 480.

In various embodiments, the signal related to the camera module 400 may include an image-related signal generated from the image sensor 439.

In various embodiments, the camera module 400 may further include a first coil 492-1 and a first magnetic body 494-1 that move the lens 431 in a direction substantially parallel to an optical axis L of the lens 431, and the signal related to the camera module 400 may include a first control signal related to the first coil 492-1.

In various embodiments, the camera assembly 420 may include an assembly case 429 disposed in the camera housing 410 and 480 and a lens carrier 430 that is disposed in the assembly case 429 and that has the lens 431 accommodated therein. The first coil 492-1 may be disposed on one of the assembly case 429 and the lens carrier 430, and the first magnetic body 494-1 may be disposed on the other one of the assembly case 429 and the lens carrier 430 to face the first coil 492-1.

In various embodiments, the camera module 400 may further include a second coil 492-2, a second magnetic body 494-2, a third coil 492-3, and a third magnetic body 494-3 that rotate the camera assembly 420 about the center of rotation C. The camera assembly 420 may include a plurality of sidewalls 441, 442, 443, and 444 that surround at least a portion of the assembly case 429. The plurality of sidewalls 441, 442, 443, and 444 may include a first sidewall 441 located in substantially the same direction as the first coil 492-1 and the first magnetic body 494-1, a second sidewall 442 that faces the first sidewall 441 and that is located in substantially the same direction as the second coil 492-2 and the second magnetic body 494-2, a third sidewall 443 connected to the first sidewall 441 and the second sidewall 442 and located in substantially the same direction as the third coil 492-3 and the third magnetic body 494-3, and a fourth sidewall 444 connected to the first sidewall 441 and the second sidewall 442 to face the third sidewall 443. The first wireless communication module 522 may be disposed substantially in a direction of the first sidewall 441, or may be disposed substantially in a direction of the fourth sidewall 444.

In various embodiments, the camera module 400 may further include a plurality of coils 492-2, 492-3, and 492-4 and a plurality of magnetic bodies 494-2, 494-3, and 494-4 that rotate the camera assembly 420 about the center of rotation C. The plurality of coils 492-2, 492-3, and 492-4 may be disposed on one of the camera assembly 420 and the camera housing 410 and 480. The plurality of magnetic bodies 494-2, 494-3, and 494-4 may be disposed on the other one of the camera assembly 420 and the camera housing 410 and 480 to face the plurality of coils 492-2, 492-3, and 492-4. The camera assembly 420 may include a plurality of sidewalls 441, 442, 443, and 444 on which the plurality of coils 492-2, 492-3, and 492-4 or the plurality of magnetic bodies 494-2, 494-3, and 494-4 are disposed.

In various embodiments, the plurality of sidewalls 441, 442, 443, and 444 of the camera assembly 420 may include a first sidewall 441, a second sidewall 442 that faces the first sidewall 441, and a third sidewall 443 and a fourth sidewall 444 that are connected to the first sidewall 441 and the second sidewall 442 and that face each other. The first wireless communication module 522 may be disposed substantially in a direction of the first sidewall 441. The plurality of magnetic bodies 494-2, 494-3, and 494-4 may be disposed on at least one of the second sidewall 442, the third sidewall 443, or the fourth sidewall 444 of the camera assembly 420. The plurality of coils 492-2, 492-3, and 492-4 may be disposed on one side of the camera housing 410 and 480 to face the plurality of magnetic bodies 494-2, 494-3, and 494-4.

In various embodiments, the plurality of magnetic bodies 494-2, 494-3, and 494-4 may include a second magnetic body 494-2 disposed on the second sidewall 442, a third magnetic body 494-3 disposed on the third sidewall 443, and a fourth magnetic body 494-4 disposed on the fourth sidewall 444. The plurality of coils 492-2, 492-3, and 492-4 may include a second coil 492-2 that faces the second magnetic body 494-2, a third coil 492-3 that faces the third magnetic body 494-3, and a fourth coil 492-4 that faces the fourth magnetic body 494-4.

In various embodiments, the plurality of coils 492-2, 492-3, and 492-4 may be disposed on at least one of the plurality of sidewalls 441, 442, 443, and 444 of the camera assembly 420 to surround the camera assembly 420. The plurality of magnetic bodies 494-2, 494-3, and 494-4 may be disposed on one side of the camera housing 410 and 480 to face the plurality of coils 492-2, 492-3, and 492-4. The signal related to the camera module 400 may include a second control signal for control of the plurality of coils 492-2, 492-3, and 492-4.

In various embodiments, the camera module 400 may further include a third wireless communication module 526, comprising communication circuitry, disposed on at least a portion of the first printed circuit board 421 so as to be spaced apart from the first wireless communication module 522 and a fourth wireless communication module 528, comprising communication circuitry, disposed on at least a portion of the second printed circuit board 510 so as to be spaced apart from the second wireless communication module 524. The third wireless communication module 526 and the fourth wireless communication module 528 may be disposed to at least partially face each other and may be configured to wirelessly transmit and/or receive the signal related to the camera module 400.

In various embodiments, the camera assembly 420 may be rotatable about at least one rotational axis (e.g., R1, R2, and R3) substantially perpendicular or parallel to an optical axis L of the lens, and the center of rotation C may be a point at which the optical axis L and the at least one rotational axis (e.g., R1, R2, and R3) cross each other.

An electronic device 101 or 300 according to an example embodiment may include a housing 310 in which at least a portion of a camera module 400 is disposed. The camera module 400 may include a camera housing 410 and 480, a camera assembly 420, at least a portion of which is accommodated in the camera housing 410 and 480, the camera assembly 420 including a lens 431, an image sensor 439, and a first printed circuit board 421, a second printed circuit board 510, at least a portion of which is disposed in the camera housing 410 and 480 to face the first printed circuit board 421, the second printed circuit board 510 being electrically connected with a third printed circuit board 350 disposed in the housing 310, a first wireless communication module 522 (comprising communication circuitry) disposed on, directly or indirectly, the first printed circuit board 421, a second wireless communication module 524 (comprising communication circuitry) disposed on, directly or indirectly, the second printed circuit board 510 such that at least a portion faces the first wireless communication module 522, in which the first wireless communication module 522 and the second wireless communication module 524 wirelessly transmit and/or receive a signal related to the camera module 400, at least one cable 530 that electrically connects the first printed circuit board 421 and the second printed circuit board 510 and supplies power to the camera module 400, and a guide plate 450, 460, and 470 connected to the camera assembly 420 and/or the camera housing 410 and 480 such that the camera assembly 420 is rotatable about at least one rotational axis R1, R2, and R3 substantially perpendicular or parallel to an optical axis L of the lens 431. The signal related to the camera module 400 may include an image-related signal generated from the image sensor 439.

In various embodiments, the at least one rotational axis (e.g., R1, R2, and R3) may include a first rotational axis R1 and a second rotational axis R2 substantially perpendicular to the optical axis L and a third rotational axis R3 substantially parallel to the optical axis L. The guide plate 450, 460, and 470 may include a first guide plate 450, a second guide plate 460, and a third guide plate 470. The second guide plate 460 may be connected to the camera housing 410 and 480 so as to be rotatable about the second rotational axis R2, the third guide plate 470 may be connected to the second guide plate 460 so as to be rotatable about the first rotational axis R1, and the first guide plate 450 may be connected to the third guide plate 470 so as to be rotatable about the third rotational axis R3 and may be connected to the camera assembly 420 so as to be rotatable together with the camera assembly 420.

In various embodiments, the first guide plate 450 may include a first central portion 455, and a first connecting portion 451 and a second connecting portion 452 that extend from the first central portion 455 and that are connected to the camera assembly 420 in a direction of the second rotational axis R2. The second guide plate 460 may include a second central portion 461, a third connecting portion 462 and a fourth connecting portion 463 that extend from the second central portion 461 and that are connected with the third guide plate 470 in a direction of the first rotational axis R1, and a fifth connecting portion 464 and a sixth connecting portion 465 that extend from the second central portion 461 and that are connected to the camera housing 410 and 480 in the direction of the second rotational axis R2. The third guide plate 470 may include a third central portion 473, and a seventh connecting portion 471 and an eighth connecting portion 472 that extend from the third central portion 473 and that are connected to the third connecting portion 462 and the fourth connecting portion 463 of the second guide plate 460 in the direction of the first rotational axis R1.

In various embodiments, the camera module 400 further include a plurality of magnetic bodies 494-2, 494-3, and 494-4 that rotate the camera assembly 420 about the center of rotation C. The camera assembly 420 may include a first sidewall 441, a second sidewall 442 that faces the first sidewall 441, a third sidewall 443 formed between the first sidewall 441 and the second sidewall 442, and a fourth sidewall 444 that faces the third sidewall 443. The first wireless communication module 522 may be disposed substantially in a direction of the first sidewall 441. The plurality of magnetic bodies 494-2, 494-3, and 494-4 may be disposed on at least one of the second sidewall 442, the third sidewall 443, or the fourth sidewall 444.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an example embodiment, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C" may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via at least a third element.

As used herein, the term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC). Thus, each "module" herein may comprise circuitry.

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various example embodiments may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

What is claimed is:

1. A camera module comprising:
   a camera housing;
   a camera assembly, at least a portion of which is accommodated in the camera housing, the camera assembly including a lens, an image sensor, and a first printed circuit board, wherein the camera assembly is coupled to the camera housing so as to be rotatable about a center of rotation of the camera assembly;
   a second printed circuit board, a portion of which is disposed in the camera housing to face at least the first printed circuit board and another portion of which is disposed outside of the camera housing;
   a first wireless communication module, comprising communication circuitry, disposed on at least a portion of the first printed circuit board; and a second wireless communication module, comprising communication circuitry, disposed on the portion of the second printed circuit board disposed in the camera housing, wherein the first wireless communication module and the second wireless communication module are configured to wirelessly transmit and/or receive a signal related to the camera module.

2. The camera module of claim 1, wherein the first wireless communication module and the second wireless communication module are disposed to at least partially face each other.

3. The camera module of claim 1, further comprising:
at least one cable configured to electrically connect the first printed circuit board and the second printed circuit board,
wherein power is to be supplied to the camera module through the cable.

4. The camera module of claim 3, wherein the first printed circuit board and the second printed circuit board include:
base portions, and first extending portions and second extending portions configured to extend to branch from sides of the base portions,
wherein the first wireless communication module is disposed on the first extending portion of the first printed circuit board,
wherein the second wireless communication module is disposed on the first extending portion of the second printed circuit board, and
wherein the cable is connected to the second extending portion of the first printed circuit board and the second extending portion of the second printed circuit board.

5. The camera module of claim 4, wherein the first extending portions of the first printed circuit board and the second printed circuit board include portions configured to face a direction substantially perpendicular to the base portions.

6. The camera module of claim 4, wherein at least a portion of the base portion of the first printed circuit board is electrically connected with the image sensor, and
wherein the base portion of the second printed circuit board includes a connector electrically connected with an external circuit board disposed outside the camera housing.

7. The camera module of claim 1, wherein the signal related to the camera module includes an image-related signal generated from the image sensor.

8. The camera module of claim 1, further comprising:
a first coil and a first magnetic body configured to move the lens in a direction substantially parallel to an optical axis of the lens,
wherein the signal related to the camera module includes a first control signal related to the first coil.

9. The camera module of claim 8, wherein the camera assembly further includes:
an assembly case disposed in the camera housing; and a lens carrier disposed in the assembly case, the lens supported by the lens carrier,
wherein the first coil is disposed on one of the assembly case and the lens carrier, and
wherein the first magnetic body is disposed on the other one of the assembly case and the lens carrier to face the first coil.

10. The camera module of claim 9, further comprising:
a second coil, a second magnetic body, a third coil, and a third magnetic body configured to rotate the camera assembly about the center of rotation, wherein the camera assembly further includes a plurality of sidewalls configured to surround at least a portion of the assembly case, wherein the plurality of sidewalls include: a first sidewall located in substantially the same direction as the first coil and the first magnetic body; a second sidewall configured to face the first sidewall and located in substantially the same direction as the second coil and the second magnetic body; a third sidewall connected to the first sidewall and the second sidewall and located in substantially the same direction as the third coil and the third magnetic body; and a fourth sidewall connected to the first sidewall and the second sidewall to face the third sidewall, and wherein the first wireless communication module is disposed substantially in a direction of the first sidewall, or is disposed substantially in a direction of the fourth sidewall.

11. The camera module of claim 1, further comprising:
a third wireless communication module, comprising communication circuitry, disposed on at least a portion of the first printed circuit board so as to be spaced apart from the first wireless communication module; and
a fourth wireless communication module, comprising communication circuitry, disposed on at least a portion of the second printed circuit board so as to be spaced apart from the second wireless communication module,
wherein the third wireless communication module and the fourth wireless communication module are disposed to at least partially face each other and are configured to wirelessly transmit and/or receive the signal related to the camera module.

12. The camera module of claim 1, wherein the camera assembly is configured to be rotatable about at least one rotational axis substantially perpendicular or parallel to an optical axis of the lens, and
wherein the center of rotation is a point at which the optical axis and the at least one rotational axis cross each other.

13. An electronic device comprising:
a housing in which at least a portion of a camera module is disposed,
wherein the camera module includes:
a camera housing;
a camera assembly, at least a portion of which is accommodated in the camera housing, the camera assembly including a lens, an image sensor, and a first printed circuit board;
a second printed circuit board, a portion of which is disposed in the camera housing to face the first printed circuit board and another portion of which is disposed outside of the camera housing, the second printed circuit board being electrically connected with a third printed circuit board disposed in the housing;
a first wireless communication module, comprising circuitry, disposed on the first printed circuit board;
a second wireless communication module, comprising circuitry, disposed on the portion of the second printed circuit board disposed in the camera housing such that at least a portion faces the first wireless communication module, the first wireless communication module and the second wireless communication module being configured to wirelessly transmit and/or receive a signal related to the camera module;
at least one cable configured to electrically connect the first printed circuit board and the second printed circuit board and supply power to the camera module; and a guide plate connected to the camera assembly and/or the camera housing such that the camera assembly is configured to be rotatable about at least one rotational axis substantially perpendicular or parallel to an optical axis of the lens, and wherein the signal related to the camera module includes an image-related signal generated from the image sensor.

14. The electronic device of claim 13, wherein the at least one rotational axis includes: a first rotational axis and a second rotational axis substantially perpendicular to the optical axis, and a third rotational axis substantially parallel to the optical axis, wherein the guide plate includes a first guide plate, a second guide plate, and a third guide plate, wherein the second guide plate is connected to the camera housing so as to be rotatable about the second rotational axis, wherein the third guide plate is connected to the second guide plate so as to be rotatable about the first rotational axis, and wherein the first guide plate is connected to the third guide plate so as to be rotatable about the third rotational axis and is connected to the camera assembly so as to be rotatable together with the camera assembly.

15. The electronic device of claim 14, wherein the first guide plate includes a first central portion, and a first connecting portion and a second connecting portion configured to extend from the first central portion and connected to the camera assembly in a direction of the second rotational axis, wherein the second guide plate includes a second central portion, a third connecting portion and a fourth connecting portion configured to extend from the second central portion and connected with the third guide plate in a direction of the first rotational axis, and a fifth connecting portion and a sixth connecting portion configured to extend from the second central portion and connected to the camera housing in the direction of the second rotational axis, and wherein the third guide plate includes a third central portion, and a seventh connecting portion and an eighth connecting portion configured to extend from the third central portion and connected to the third connecting portion and the fourth connecting portion of the second guide plate in the direction of the first rotational axis.

16. The electronic device of claim 13, wherein the camera module further includes a plurality of magnetic bodies configured to rotate the camera assembly about the center of rotation, wherein the camera assembly includes a first sidewall, a second sidewall configured to face the first sidewall, a third sidewall formed between the first sidewall and the second sidewall, and a fourth sidewall configured to face the third sidewall, wherein the first wireless communication module is disposed substantially in a direction of the first sidewall, and wherein the plurality of magnetic bodies are disposed on at least one of the second sidewall, the third sidewall, or the fourth sidewall.

17. A camera module comprising:
a camera housing;
a camera assembly, at least a portion of which is accommodated in the camera housing, the camera assembly including a lens, an image sensor, and a first printed circuit board, wherein the camera assembly is coupled to the camera housing so as to be rotatable about a center of rotation of the camera assembly;

a second printed circuit board, at least a portion of which is disposed in the camera housing to face at least the first printed circuit board;

a first wireless communication module, comprising communication circuitry, disposed on at least a portion of the first printed circuit board;

a second wireless communication module, comprising communication circuitry, disposed on at least a portion of the second printed circuit board; and a plurality of coils and a plurality of magnetic bodies configured to rotate the camera assembly about the center of rotation, wherein the first wireless communication module and the second wireless communication module are configured to wirelessly transmit and/or receive a signal related to the camera module, wherein the plurality of coils are disposed on one of the camera assembly and the camera housing, wherein the plurality of magnetic bodies are disposed on the other one of the camera assembly and the camera housing to face the plurality of coils, and wherein the camera assembly includes a plurality of sidewalls on which the plurality of coils and/or the plurality of magnetic bodies are disposed.

18. The camera module of claim 17, wherein the plurality of sidewalls of the camera assembly include:

a first sidewall; a second sidewall configured to face the first sidewall; and a third sidewall and a fourth sidewall connected to the first sidewall and the second sidewall and configured to face each other, wherein the first wireless communication module is disposed substantially in a direction of the first sidewall, wherein the plurality of magnetic bodies are disposed on at least one of the second sidewall, the third sidewall, or the fourth sidewall of the camera assembly, and wherein the plurality of coils are disposed on one side of the camera housing to face the plurality of magnetic bodies.

19. The camera module of claim 18, wherein the plurality of magnetic bodies include a second magnetic body disposed on the second sidewall, a third magnetic body disposed on the third sidewall, and a fourth magnetic body disposed on the fourth sidewall, and wherein the plurality of coils include a second coil configured to face the second magnetic body, a third coil configured to face the third magnetic body, and a fourth coil configured to face the fourth magnetic body.

20. The camera module of claim 17, wherein the plurality of coils are disposed on at least one of the plurality of sidewalls of the camera assembly to at least partially surround the camera assembly, wherein the plurality of magnetic bodies are disposed on a side of the camera housing to face the plurality of coils, and wherein the signal related to the camera module includes a second control signal for control of the plurality of coils.

* * * * *